United States Patent
Weeks et al.

(10) Patent No.: US 9,303,156 B2
(45) Date of Patent: Apr. 5, 2016

(54) FUNCTIONALIZED BLOCK COMPOSITE AND CRYSTALLINE BLOCK COMPOSITE COMPOSITIONS AS COMPATIBILIZERS

(71) Applicants: Ronald J. Weeks, Lake Jackson, TX (US); Yushan Hu, Pearland, TX (US); Kim L. Walton, Lake Jackson, TX (US); Gary R. Marchand, Gonzales, LA (US); Michael D. Read, Midland, MI (US); H. C. Silvis, Midland, MI (US)

(72) Inventors: Ronald J. Weeks, Lake Jackson, TX (US); Yushan Hu, Pearland, TX (US); Kim L. Walton, Lake Jackson, TX (US); Gary R. Marchand, Gonzales, LA (US); Michael D. Read, Midland, MI (US); H. C. Silvis, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/364,352
(22) PCT Filed: Dec. 12, 2012
(86) PCT No.: PCT/US2012/069190
§ 371 (c)(1),
(2) Date: Jun. 11, 2014
(87) PCT Pub. No.: WO2013/090393
PCT Pub. Date: Jun. 20, 2013

(65) Prior Publication Data
US 2014/0343229 A1 Nov. 20, 2014

Related U.S. Application Data

(60) Provisional application No. 61/570,464, filed on Dec. 14, 2011.

(51) Int. Cl.
C08L 51/06 (2006.01)
C08L 23/06 (2006.01)
(Continued)

(52) U.S. Cl.
CPC .................. *C08L 23/06* (2013.01); *C08L 23/10* (2013.01); *C08L 23/12* (2013.01); *C08L 77/00* (2013.01); *C08L 2205/02* (2013.01); *C08L 2205/035* (2013.01); *C08L 2207/066* (2013.01); *C08L 2207/20* (2013.01)

(58) Field of Classification Search
CPC .......... C08L 2205/02; C08L 2205/035; C08L 2207/066; C08L 51/06
See application file for complete search history.

(56) References Cited

U.S. PATENT DOCUMENTS 5,719,198 A   2/1998   Young et al.
6,241,168 B1  6/2001   Young et al.
(Continued)

FOREIGN PATENT DOCUMENTS

EP      719301 A1      7/1996
WO   2005073283 A1    8/2005
(Continued)

OTHER PUBLICATIONS

Borse, Nitin, et al., Enhancement in Tear Properties of Single Site Catalyzed LLDPE Blown Films at Higher Draw-Down, NOVA Chemicals Technical Center, Calgary.

(Continued)

*Primary Examiner* — Mark Kaucher

(57) ABSTRACT

The invention provides functionalized block composites and crystalline block composites as compatibilizers. In particular, the invention provides compositions of at least three polymers and a compatibilizer. The compatibilizer comprises a functionalized olefin-based polymer formed from at least (A) and (B): (A) a crystalline block composite comprising: a block copolymer comprising a propylene-based crystalline block and crystalline ethylene-based block; a propylene-based crystalline polymer; and, a crystalline ethylene-based polymer; and (B) at least one functionalization agent or a functionalized olefin-based polymer formed from at least (A) and (B): (A) a crystalline block composite comprising: a block copolymer comprising a propylene-based crystalline block and crystalline ethylene-based block; a propylene-based crystalline polymer; and, a crystalline ethylene-based polymer; and (B) at least one functionalization agent.

10 Claims, 12 Drawing Sheets

(51) Int. Cl.
*C08L 23/10* (2006.01)
*C08L 23/12* (2006.01)
*C08L 77/00* (2006.01)

(56) References Cited

U.S. PATENT DOCUMENTS

| | | |
|---|---|---|
| 6,469,099 B1 | 10/2002 | Farah et al. |
| 6,814,826 B1 | 11/2004 | Bell |
| 7,355,089 B2 | 4/2008 | Chang et al. |
| 7,608,668 B2 | 10/2009 | Li Pi Shan et al. |
| 7,622,529 B2 | 11/2009 | Walton et al. |
| 7,858,706 B2 | 12/2010 | Arriola et al. |
| 7,897,689 B2 | 3/2011 | Harris et al. |
| 2005/0131160 A1* | 6/2005 | Shimizu et al. ............. 525/242 |
| 2006/0199930 A1 | 9/2006 | Li Pi Shan et al. |
| 2007/0167578 A1 | 7/2007 | Arriola et al. |
| 2008/0269412 A1 | 10/2008 | Carnahan et al. |
| 2008/0311812 A1 | 12/2008 | Arriola et al. |
| 2010/0093942 A1 | 4/2010 | Silvis et al. |
| 2010/0143651 A1 | 6/2010 | Silvis et al. |
| 2010/0292403 A1 | 11/2010 | Ansems et al. |
| 2011/0082249 A1 | 4/2011 | Shan et al. |
| 2011/0082257 A1 | 4/2011 | Carnahan et al. |
| 2011/0082258 A1 | 4/2011 | Walton et al. |
| 2011/0313106 A1 | 12/2011 | Shan et al. |
| 2011/0313107 A1 | 12/2011 | Shan et al. |
| 2011/0313108 A1 | 12/2011 | Shan et al. |
| 2012/0208961 A1 | 8/2012 | Carnahan et al. |

FOREIGN PATENT DOCUMENTS

| | | |
|---|---|---|
| WO | 2005/090426 A1 | 9/2005 |
| WO | 2007127222 A1 | 11/2007 |
| WO | 2009012215 A1 | 1/2009 |
| WO | 2011/041698 A1 | 4/2011 |
| WO | 2011/041699 A1 | 4/2011 |

OTHER PUBLICATIONS

Borse, Nitin, et al., Unusual Enchancement in Tear Properties os Single-Site LLDPE Blown Films at Higher Draw-Down Ratio, NOVA Chemicals Technical Centre, Calgary.

Search Report and Written Opinion of the International Searching Authority for PCT/US2012/069190, Mail Date Feb. 15, 2013, 8 pages.

International Preliiminary Report on Patentability for PCT/US2012/069190, Issuance Date Jun. 17, 2014, 6 pages.

* cited by examiner

Example L    Example M    Example 12

FUNCTIONALIZED BLOCK COMPOSITE AND CRYSTALLINE BLOCK COMPOSITE COMPOSITIONS AS COMPATIBILIZERS

FIELD OF THE INVENTION

This invention relates to functionalized block composites and crystalline block composites and their use as polymer compatibilizers.

BACKGROUND

Recycling has taken on an increasingly important role in product life cycles, particularly in the area of polymer recycling. In spite of a number of advances, challenges remain in recycling fundamentally incompatible waste streams. The carpet industry, for example, has developed ways of separating waste streams by removing face yarns from the woven primaries and filled polymeric backings. These separations are rarely complete, leaving the issue of using mixed streams of recycled materials that are not compatible. These mixed streams typically involve combinations of: Nylon 6, Nylon 6,6, homopolymer polypropylene (PP), polyethylenes (PE), other miscellaneous polyolefins (ethylene vinyl acetate (EVA), etc.), polyurethanes, vinyl acetate emulsions (VAE), styrenic block copolymers (SBC) and other types of latexes, polyesters, as well as fillers such as $CaCO_3$ and coal fly ash. Several mixes of these materials are described in EP 0719301 B1. Similar issues are expected in the artificial turf arena which has more limited mixes of the above materials.

U.S. Pat. No. 7,897,689 relates to functionalized interpolymers derived from base olefin interpolymers, which are prepared by polymerizing one or more monomers or mixtures of monomers, such as ethylene and one or more comonomers, to form an interpolymer product having unique physical properties. The functionalized olefin interpolymers contain two or more differing regions or segments (blocks), resulting in unique processing and physical properties.

US Patent Application Publication No. US2010-0093942 relates to polyolefin blend compositions of polar and/or nonpolar polymers, with at least one functionalized polyolefin polymer selected from the group consisting of: amine functionalized, hydroxyl functionalized, imide functionalized, anhydride functionalized, or carboxylic acid functionalized polyolefin polymers. Also disclosed are methods for making the functionalized polyolefin polymer and materials and articles containing at least one component prepared from such compositions U.S. Pat. No. 7,622,529 relates to olefin interpolymers as compatibilizers, which are prepared by polymerizing one or more monomers or mixtures of monomers, such as ethylene and one or more comonomers, to form an interpolymer product having unique physical properties. The olefin interpolymers contain two or more differing regions or segments (blocks), resulting in unique processing and physical properties.

WO/2011/041696 relates to block composites and their use as impact modifiers; WO/2011/041698 relates to block composites in soft compounds; and WO/2011/041699 relates to block composites in thermoplastic vulcanisates.

SUMMARY

The invention provides a composition comprising: a) A first polymer; b) a second polymer; c) a third polymer; and, d) a compatibilizer, wherein the compatibilizer is:

i) a functionalized olefin-based polymer formed from at least (A) and (B):
(A) a block composite comprising:
i) a block copolymer comprising a propylene-based crystalline block and an ethylene/α-olefin block;
ii) a propylene-based crystalline polymer; and,
iii) an ethylene/α-olefin polymer; and
(B) at least one functionalization agent; and/or
(ii) a functionalized olefin-based polymer formed from at least (A) and (B):
(A) a crystalline block composite comprising:
i) a block copolymer comprising a crystalline alpha-olefin block and a crystalline ethylene block;
ii) a crystalline alpha-olefin based polymer; and,
iii) a crystalline ethylene based polymer; and
(B) at least one functionalization agent
wherein the first, second and third polymers are different.

DETAILED DESCRIPTION

Figure 1:
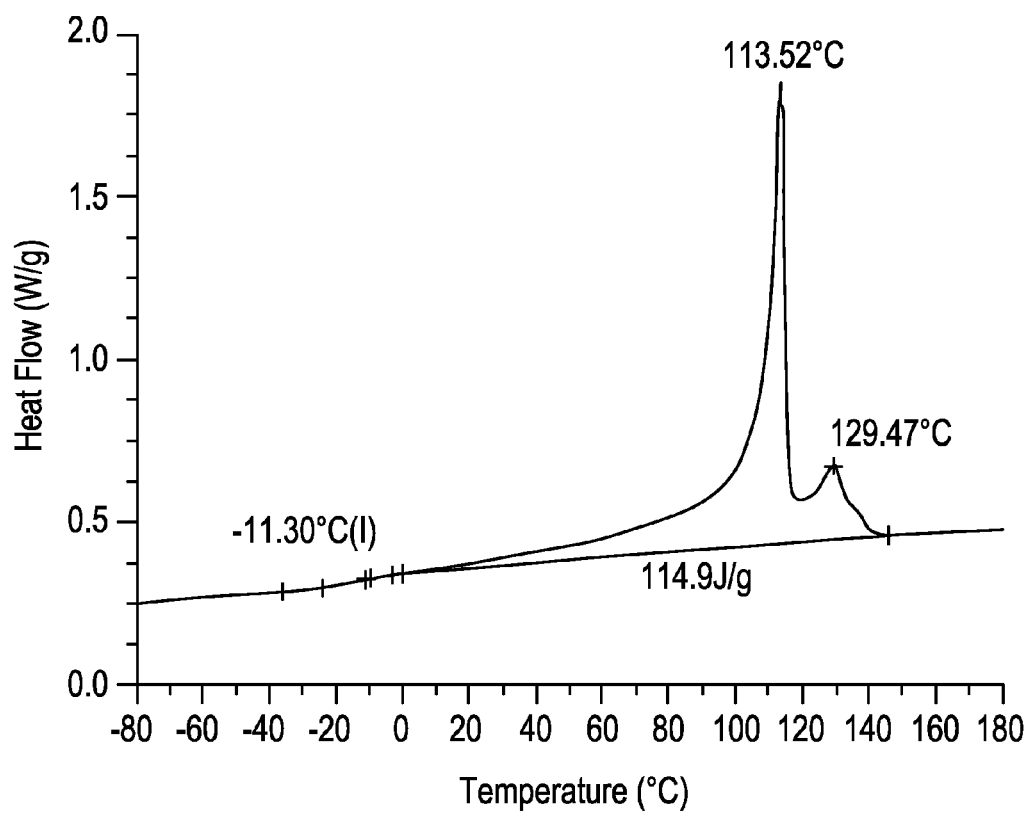
FIG. 1 shows the DSC profile for CBC2.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "polyethylene" includes homopolymers of ethylene and copolymers of ethylene and one or more $C_{3-8}$ α-olefins in which ethylene comprises at least 50 mole percent.

The term "polypropylene" includes homopolymers of propylene such as isotactic polypropylene, syndiotactic polypropylene, and copolymers of propylene and one or more $C_{2,4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers typically have, but are not limited to, densities of 0.88 g/cc to 0.91 g/cc and melting points of 100° C. to 170° C.

The term "amorphous" refers to a polymer lacking a crystalline melting point.

The term "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s).

The term "block composite" refers to polymers comprising a soft copolymer, polymerized units in which the comonomer content is greater than 10 mol % and less than 90 mol % and preferably greater than 20 mol % and less than 80 mol %, and most preferably greater than 33 mol % and less than 75 mol %, a hard polymer, in which the monomer is present in an amount greater than 90 mol % and up to 100 mol %, and preferably greater than 93 mol % and up to 100 mol %, and more preferably greater than 95 mol % and up to 100 mol %, and most preferably greater than 98 mol % and up to mol %, and a block copolymer, preferably a diblock, having a soft segment and a hard segment, wherein the hard segment of the block copolymer is essentially the same composition as the hard polymer in the block composite and the soft segment of the block copolymer is essentially the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8. Such block composites are described in, for example, US Patent Application Publication Nos US2011-0082257, US2011-0082258 and US2011-0082249, all published on Apr. 7, 2011 and incorporated herein by reference with respect to descriptions of the block composites, processes to make them and methods of analyzing them.

The term "crystalline block composite" (CBC) refers to polymers comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the block composite and the CAOB of the block copolymer is essentially the same composition as the CAOP of the block composite. Additionally, the compositional split between the amount of CEP and CAOP will be essentially the same as that between the corresponding blocks in the block copolymer. The block copolymers can be linear or branched. More specifically, each of the respective block segments can contain long chain branches, but the block copolymer segment is substantially linear as opposed to containing grafted or branched blocks. When produced in a continuous process, the crystalline block composites desirably possess PDI from 1.7 to 15, preferably 1.8 to 10, preferably from 1.8 to 5, more preferably from 1.8 to 3.5. Such crystalline block composites are described in, for example, U.S. Provisional Application Serial Nos 61/356,978, 61/356,957 and 61/356,990, all filed on Jun. 21, 2010 and incorporated herein by reference with respect to descriptions of the block composites, processes to make them and methods of analyzing them.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. CAOBs with propylene crystallinity have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

Suitable monomers for use in preparing the copolymers of the present invention include any addition polymerizable monomer, preferably any olefin or diolefin monomer, more preferably any α-olefin, and most preferably propylene and at least one copolymerizable comonomer having from 2 or 4 to 20 carbons, or 1-butene and at least one copolymerizable comonomer having 2 or from 5 to 20 carbons, 4-methyl-1-pentene and at least one different copolymerizable comonomer having from 4 to 20 carbons. Preferably, the copolymers comprise propylene and ethylene. Comonomer content in the block composite and crystalline block composite polymers may be measured using any suitable technique, with techniques based on nuclear magnetic resonance (NMR) spectroscopy preferred.

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the block composites of the invention comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carry-over of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

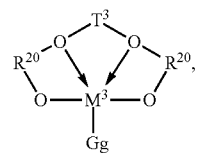

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

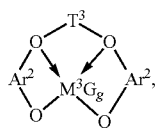

wherein: $T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

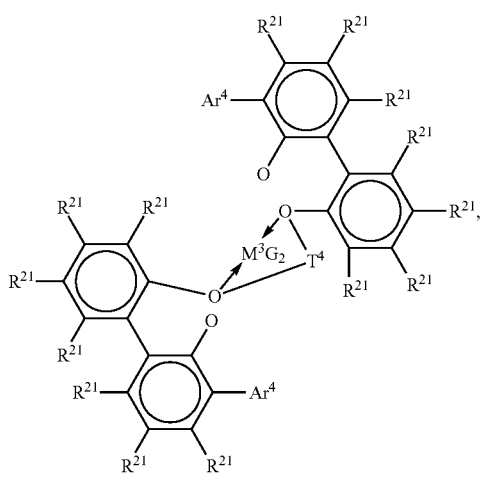

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

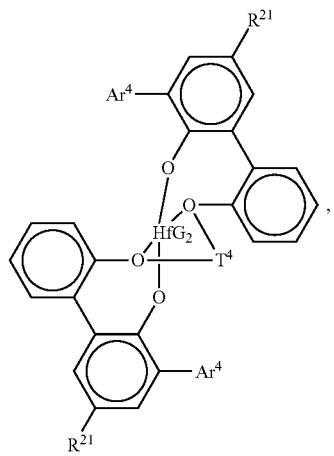

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

Other suitable metal complexes are those of the formula:

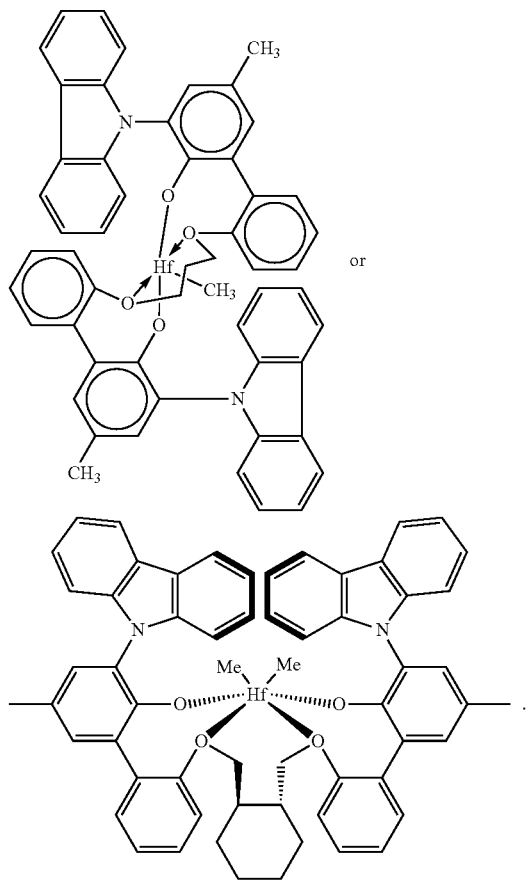

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Preferably, the block composite polymers comprise propylene, 1-butene or 4-methyl-1-pentene and one or more comonomers. Preferably, the block polymers of the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers. Additional suitable comonomers are selected from diolefins, cyclic olefins, and cyclic diolefins, halogenated vinyl compounds, and vinylidene aromatic compounds.

In the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above.

In some embodiments, the block composites have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composites and crystalline block composites preferably have a Tm greater than 100° C., preferably greater than 120° C., and more preferably greater than 125° C. Preferably the Tm is in the range of from 100° C. to 250° C., more preferably from 120° C. to 220° C. and also preferably in the range of from 125° C. to 220° C. Preferably the MFR of the block composites and crystalline block composites is from 0.1 to 1000 dg/min, from 0.1 to 50 dg/min, from 0.1 to 30 dg/min, from 1 to 12 dg/min, from 1.1 to 10 dg/min or from 1.2 to 8 dg/min. Preferably the split between the components of the block composite or crystalline block composite is 30/70 to 70/30, from 40/60 to 60/40, or preferably 50/50.

Further preferably, the block composites and crystalline block composites have a weight average molecular weight (Mw) from 10,000 to about 2,500,000, preferably from 35,000 to about 1,000,000 and more preferably from 50,000 to about 300,000, preferably from 50,000 to about 200,000.

Preferably the block composite polymers comprise from 0.5 to 95 wt % soft copolymer, from 0.5 to 95 wt % hard polymer and from 5 to 99 wt % block copolymer. More preferably, the block composite polymers comprise from 0.5 to 79 wt % soft copolymer, from 0.5 to 79 wt % hard polymer and from 20 to 99 wt % block copolymer and more preferably from 0.5 to 49 wt % soft copolymer, from 0.5 to 49 wt % hard polymer and from 50 to 99 wt % block copolymer. Weight percents are based on total weight of block composite. The sum of the weight percents of soft copolymer, hard polymer and block copolymer equals 100%.

Preferably the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the block composite comprise from 5 to 95 weight percent soft blocks and 95 to 5 wt percent hard blocks. They may comprise 10 wt % to 90 wt % soft blocks and 90 wt % to 10 wt % hard blocks. More preferably, the block copolymers comprise 25 to 75 wt % soft blocks and 75 to 25 wt % hard blocks, and even more preferably they comprise 30 to 70 wt % soft blocks and 70 to 30 wt % hard blocks.

Preferably, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

In some embodiments, the crystalline block composites have a Crystalline Block Composite Index (CBCI), as defined below, that is greater than zero but less than about 0.4 or from about 0.1 to about 0.3. In other embodiments, CBCI is greater than about 0.4 and up to about 1.0. In some embodiments, the CBCI is in the range of from about 0.1 to about 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Some embodiments of the present invention comprise compositions comprising from 98 to 0.5 wt % crystalline block composite and/or block composite with the remainder being polyethylene, polyalpha-olefin, and combinations thereof. Preferably, the compositions comprise 50 to 0.5 wt % CBC and/or BC and more preferably 15 to 0.5 wt % CBC and/or BC.

Preferred suitable BC and/or CBC resin(s) will have heat of fusion values at least about 50 Joules per gram (J/g), more preferably at least about 70 J/g, still more preferably at least about 80 J/g, and most preferably at least about 90 J/g, as measured by DSC.

The block composites and crystalline block composites are modified by, for example, grafting, hydrogenation, nitrene insertion reactions, or other functionalization reactions using functionalization agents such as those known to those skilled in the art. Preferred functionalizations are grafting reactions using a free radical mechanism. For maleic anhydride (MAH) grafting in particular, the grafting level is preferably from 0.10 wt % to 1.8 wt %, more preferred 0.5 to 1.4%, most preferred 0.7 to 1.2% For the conversion of MAH grafted CBC or BC to imide-grafted CBC or BC, the conversion is >50%, more preferred >70%, most preferred >90% with a maximum of 100%. Preferably the functionalization agent is selected from maleic anhydride, peroxide, and amine.

In some compositions of the invention, the first polymer is a polyethylene, the second polymer is a polypropylene, and the third polymer is selected from the group consisting of polyamide, polyurethane and polyester.

Some compositions comprise from 98 to 0.5 wt % crystalline block composite with the remainder being polyethylene, polypropylene, and a third polymer selected from PA, PU and PET, and combinations thereof. Preferably, the compositions comprise 50 to 0.5 wt % CBC, 20 wt % to 2 wt % CBC, or 15 wt % to 0.5 wt % CBC.

Some embodiments of the present invention comprise compositions comprising from 98 to 0.5 wt % block composite with the remainder being polyethylene, polypropylene, and a third polymer selected from PA, PU and PET, and combinations thereof. Preferably, the compositions comprise 50 to 0.5 wt % BC, 20 wt % to 2 wt % CBC, and more preferably 15 to 0.5 wt % BC.

In some embodiments, the BC or CBC is present in an amount of from 2 wt % to 20 wt %, a polyethylene is present in an amount of from 5 wt % to 85 wt %, a polypropylene is present in an amount of from 5 wt % to 40 wt % and an additional polymer is present in an amount of from 5 wt % to 50 wt %, by total weight of the polymers.

Any polyethylene, including, but not limited to, High Density Polyethylene (HDPE) or Linear Low Density Polyethylene (LLDPE) may be used such as those produced via gas-phase, solution, or slurry process with either a chromium catalyst (broad MWD), Ziegler Natta catalyst (med MWD), or metallocene or post-metallocene catalyst (narrow MWD). Furthermore, any LDPE homopolymer or copolymer produced via high pressure free radical polymerization in either an autoclave or tubular reactor may be used. The polyethylene used in the present invention may be HDPE or LLDPE with densities of from 0.87 to 0.98 g/cm$^3$. Further, the polyethylene may be a Low Density Polyethylene (LDPE) homopolymer having a density range from 0.91 to 0.94 g/cm$^3$ or may be copolymerized with suitable comonomers such as vinyl acetate, α,β-ethylenically unsaturated mono- or dicarboxylic acids, and combinations thereof, glycidyl methacrylate, ethyl acrylate, or butyl acrylate. The copolymers of LDPE containing α,β-ethylenically unsaturated mono- or dicarboxylic acids may be neutralized in a post polymerization process with metal ions and compounds of alkali metals, alkaline earth metals, and transition metals; and combinations thereof. Particular cation sources include, but are not limited to, metal ions and compounds of lithium, sodium, potassium, magnesium, cesium, calcium, barium, manganese, copper, zinc, tin, rare earth metals, and combinations thereof. The polyethylene may have an MI of from 1 to 10 at 190° C. and be present in a amount of 5 wt % to 40 wt % based on total weight of polymer. The polyethylene may also be an olefin block copolymer such as those available from The Dow Chemical Company under the tradename INFUSE™ OBCs and described in, for example, U.S. Pat. No. 7,608,668 and U.S. Pat. No. 7,858,706.

A polypropylene polymer used in the present invention may be any polypropylene polymer made via any means known to one of skill in the art or polypropylene polymer blend, such as a homopolymer polypropylene, a random ethylene or butene copolymer of polypropylene, or an impact modified polypropylene blend which contains either a homopolymer polypropylene or a crystalline random copolymer of ethylene and propylene combined with a rubbery ethylene-propylene copolymer. The polypropylene may have an MFR at 230° C. of 1 to 100 and be present in an amount of from 5 wt % to 40 wt % based on total weight of polymer. The stereoregularity of the polypropylene polymer may be isotactic, syndiotactic, or atactic Third polymers include, but are not limited to, polyurethanes, polyamides, and polyesters and combinations thereof. Suitable polyamides include, but are not limited to, aliphatic polyamides, such as polycaprolactam (nylon 6), preferably with a density of 1.14 g/cc and Mw of 20000 g/mol to 30,000 g/mol; poly(hexamethylene adipamide) (nylon 6,6), preferably with a density of 1.14 g/cc and Mw of 12000 g/mol to 20000 g/mol; poly(hexamethylene sebacamide); and aromatic polyamides (or polyaramides). Suitable polyesters include, but are not limited to, poly(ethylene terephthalate) (PET), polybutylene terephthalate) (PBT), Polyethylene naphthalate (PEN) (Poly(ethylene 2,6-naphthalate) and polyethyleneimine (PEI). Suitable polyurethanes (PU) include reaction products of at least one isocyanate or polyisocyanate with at least one polyol such as diphenylmethane diisocyanate with polypropylene glycol.

Third polymers can also be selected from the group consisting of polyethers, polyetherimides, polyvinylalcohols, polycarbonates, polylactic acids, polyamide esters and combinations thereof.

Any of the first, second or third polymers may be derived from recycled polymers including, but not limited to, those derived from carpet materials including yarns and backing materials, artificial turf or sources such as post-consumer recycling materials and various polymer sources from vehicles. The composition of the invention may be used in applications such as, but not limited to, films, foams, molded goods and wire and cable applications.

Additives may be added to the compositions, including any additives that may be used in polymer compositions including, but not limited to, slip agents, anti-blocking agents, plasticizers, antioxidants, UV stabilizers, colorants or pigments, fillers, lubricants, antifogging agents, flow aids, coupling agents, cross-linking agents, nucleating agents, surfactants, solvents, flame retardants, antistatic agents, and combinations thereof.

Test Methods

MFR:

Melt Flow Rate is measured in accordance with ASTM D1238, Condition 230° C./2.16 kg.

DSC:

Differential Scanning calorimetry is used to measure, among other things, the heats of fusion of the crystalline block and block composites and is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 190° C. at 10° C./min heating rate. The cooling and second heating curves are recorded. For the heat of fusion measurements for the CBC and specified BC resins, as known and routinely performed by skilled practitioners in this area, the baseline for the calculation is was drawn from the flat initial section prior to the onset of melting (typically in the range of from about −10 to about 20° C. for these types of materials) and extends to the end of melting for the second heating curve.

MAH Grafting Level

The polymer pellets are dried in a vacuum oven at 150° C. for 1.5 hr. The pellets are molded into film using a Carver hydraulic press at 190° C. for 30 sec under 3000 lb pressure at ambient atmosphere. The films of 3 mil thickness are cooled by transferring the plates to the lower level platens set at ambient temperature. IR spectra are collected using Nicolet 6700 FTIR. FTIR spectra were used for determining the level of g-MAH in each sample using a method that has been calibrated against the tetrabutylammonium Hydroxide (TBAOH) titration. The wt % of g-MAH was determined from the ratio of the height of the peak at ca. 1790 $cm^{-1}$ corresponding to the carbonyl stretch of the anhydride, to the height of the 2751 $cm^{-1}$, as follows $$\text{wt \% } MAH = 0.0344 \times \frac{\text{(peak height @ } ca. \text{ 1790 cm}^{-1})}{\text{(peak height @ } ca. \text{ 2751 cm}^{-1})} + 0.1925 \times \frac{\text{(peak height @ } ca. \text{ 1790 cm}^{-1})}{\text{(peak height @ } ca. \text{ 2751 cm}^{-1})} + 0.0767$$

As for the TBAOH titration, 1-2 g of the dried resin was dissolved in 150 ml xylene by heating the sample to 100 deg. C. on a stirred hot plate. Upon dissolution, the sample was titrated, while hot, with 0.025N TBAOH in 1:1 toluene/methanol using 10 drops of Bromothymol blue as indicator. The endpoint is recorded when solution turns blue.

Silane Grafting Level Analysis

Duplicate samples are prepared by transferring approximately 3.0 grams of the pellets into pre-cleaned 2-dram polyethylene vials. Samples are vacuum stripped at 140° C. for 20 minutes in a vacuum oven to remove any residual, volatile, or surface silane. Duplicate Si standards are prepared from their NIST traceable standard solution into similar vials. The standards are diluted to a similar volume as the samples using pure water. A blank sample of the water is also prepared. The samples, standards and a blank are then analyzed for Si. Specifically, irradiation is done for 3 minutes at 250 kW reactor power. The waiting time is 9 minutes and the counting time was 270 seconds using an HPGe detector set. The Si concentrations are calculated in ppm using Canberra software and comparative technique. Typical uncertainty ranges from 2% to 5% relative and the detection limit is less than 100 ppm. The vinyltrimethoxysilane content is back calculated using stoichiometry, assuming that the grafting is done using vinyltrimethoxysilane only.

Tensile Properties

For tensile property measurements, samples are compression molded into 70 mil thick plaque (5 inch×5 inch) with a Carver hydraulic press at 190° C. for 6 min at 6000 lb at ambient atmosphere. The plaques are then cooled to 50° C. at 15° C./min in the press under 30000 lb force. Stress-strain behavior in uniaxial tension is measured using ASTM D1708 microtensile specimens. Specimens are die-cut from the plaques in conformation of the dimensions specified in ASTM D1708. The gauge length of samples is 22 mm and samples are stretched with an Instron at 554% of (initial gauge length) $min^{-1}$ at 23° C. Tensile properties are reported from an average of 5 specimens.

$^{13}$C Nuclear Magnetic Resonance (NMR)

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C. The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute. Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene}=0.645(M_{polystyrene})$. Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in orthodichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

High Temperature Liquid Chromatography (HTLC)

HTLC is performed according to the methods disclosed in U.S. Pat. No. 8,076,147 and US Patent Application Publication No. 2011-152499, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by PolymerChar, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; //Maintain the constant flow rate of 0.01 mL/min from 0-490 min.
2. 491 min: flow=0.20 min; //Increase the flow rate to 0.20 mL/min.
3. 492 min: % B=100; //Increase the mobile phase composition to 100% TCB
4. 502 min: % B=100; //Wash the column using 2 mL of TCB Equilibrium Step:
5. 503 min: % B=0; //Change the mobile phase composition to 100% of 1-decanol or decane
6. 513 min: % B=0; //Equilibrate the column using 2 mL of weak eluent
7. 514 min: flow=0.2 mL/min; //Maintain the constant flow of 0.2 mL/min from 491-514 min
8. 515 min: flow=0.01 mL/min; //Lower the flow rate to 0.01 mL/min.

After step 8, the flow rate and mobile phase composition were the same as the initial conditions of the run gradient.

The D2 flow rate was at 2.51 mL/min. Two 60 µL loops were installed on the 10-port switch valve. 30-µL of the eluent from D1 column was loaded onto the SEC column with every switch of the valve.

The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

The weight % of isolated PP is measured as the area that corresponds to the hard block composition based on the isolated peak and the retention volume as determined by a composition calibration curve.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

If the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mc$^2$ (available from Polymer Char, Valencia, Spain).

Estimating the Block Composite Index

For a block composite derived from ethylene and propylene, the insoluble fractions will contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \%} C_{2_{Insoluble}}) + w_{soluble}(\text{wt \%} C_{2_{soluble}}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% } C_{2_{Overall \, or \, xylene \, insoluble}} = \quad \text{Eq. 2}$$
$$w_{iPPHard}(\text{wt \% } C_{2_{iPP}}) + w_{EPsoft}(\text{wt \% } C_{2_{EPsoft}})$$

$$w_{iPPhard} = \frac{\text{wt \% } C_{2_{overall \, or \, xyleneinsoluble}} - \text{wt \% } C_{2_{EPsoft}}}{\text{wt \% } C_{2_{iPPhard}} - \text{wt \% } C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an iPP-EP block composite contains an overall ethylene content of 47 wt % $C_2$ and is made under conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art carries out a xylene extraction of the polymer and recovers 40 wt % insoluble and 60 wt % soluble, this would be an unexpected result and this would lead to the conclusion that a fraction of block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. The term block composite index (BCI) is herein defined to equal the weight percentage of diblock divided by 100% (i.e. weight fraction). The value of the block composite index can range from 0 to 1, wherein 1 would be equal to 100% diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

Estimating the Crystalline Block Composite Index (CBCI)

Crystalline block composites having CAOP and CAOB composed of crystalline polypropylene and a CEP and CEB composed of crystalline polyethylene cannot be fractionated by conventional means. Techniques based on solvent or temperature fractionation, for example, using xylene fractionation, solvent/non-solvent separation, temperature rising elution fractionation, or crystallization elution fractionation are not capable of resolving the block copolymer since the CEB and CAOB cocrystallize with the CEP and CAOP, respectively. However, using a method such as high temperature liquid chromatography which separates polymer chains using a combination of a mixed solvent/non-solvent and a graphitic column, crystalline polymer species such as polypropylene and polyethylene can be separated from each other and from the block copolymer.

For crystalline block composites, the amount of isolated PP is less than if the polymer was a simple blend of iPP homopolymer (in this example the CAOP) and polyethylene (in this case the CEP). Consequently, the polyethylene fraction contains an appreciable amount of propylene that would not otherwise be present if the polymer was simply a blend of iPP and polyethylene. To account for this "extra propylene", a mass balance calculation can be performed to estimate a crystalline block composite index from the amount of the polypropylene and polyethylene fractions and the weight % propylene present in each of the fractions that are separated by HTLC. The polymers contained within the crystalline block composite include iPP-PE diblock, unbound iPP, and unbound PE where the individual PP or PE components can contain a minor amount of ethylene or propylene respectively.

Composition of the Crystalline Block Composite

A summation of the weight % propylene from each component in the polymer according to equation 1 results in the overall weight % propylene (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the crystalline block composite, the overall amount of iPP or PE is contained within the blocks present in the diblock and the unbound iPP and PE polymers.

$$\text{Wt \% } C3_{Overall} = w_{PP}(\text{wt \% } C3_{PP}) + w_{PE}(\text{wt \% } C3_{PE}) \qquad \text{Eq. 1}$$

where $w_{PP}$=weight fraction of PP in the polymer $w_{PE}$=weight fraction of PE in the polymer wt % $C3_{PP}$=weight percent of propylene in PP component or block wt % $C3_{PE}$=weight percent of propylene in PE component or block.

Note that the overall weight % of propylene (C3) is preferably measured from C13 NMR or some other composition measurement that represents the total amount of C3 present in the whole polymer. The weight % propylene in the iPP block (wt % $C3_{PP}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Calculating the Ratio of PP to PE in the Crystalline Block Composite

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \qquad \text{Eq. 2}$$

where $w_{PP}$=weight fraction of PP present in the whole polymer wt % $C3_{PP}$=weight percent of propylene in PP component or block wt % $C3_{PE}$=weight percent of propylene in PE component or block Estimating the Amount of the Diblock in the Crystalline Block Composite Applying equations 3 through 5, the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$\text{wt \% } C3_{Overall} = \qquad \text{Eq. 3}$$
$$w_{PPisolated}(\text{wt \% } C3_{PP}) + w_{PE\text{-}fraction}(\text{wt \% } C3_{PE\text{-}fraction})$$

$$\text{wt \% } C3_{PE\text{-}fraction} = \frac{\text{wt \% } C3_{Overall} - w_{PPisolated}(\text{wt \% } C3_{PP})}{w_{PE\text{-}fraction}} \qquad \text{Eq. 4}$$

$$w_{PE\text{-}fraction} = 1 - w_{PPisolated}25 \qquad \text{Eq. 5}$$

where $w_{PPisolated}$=weight fraction of isolated PP from HTLC $W_{PE\text{-}fraction}$=weight fraction of PE separated from HTLC, containing the diblock and unbound PE wt % $C3_{PP}$=weight % of propylene in the PP; which is also the same amount of propylene present in the PP block and in the unbound PP wt % $C3_{PE\text{-}fraction}$=weight % of propylene in the PE-fraction that was separated by HTLC wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'.

To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt \% } C3_{PE\text{-}fraction} - \text{wt \% } C3_{PE}}{\text{wt \% } C3_{PP} - \text{wt \% } C3_{PE}} \quad \text{Eq. 6}$$

Where
wt % $C3_{PE\text{-}fraction}$=weight % of propylene in the PE-fraction that was separated by HTLC (Equation 4)
wt % $C3_{PP}$=weight % of propylene in the PP component or block (defined previously)
wt % $C3_{PE}$=weight % of propylene in the PE component or block (defined previously)
$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC.

To estimate the crystalline block composite index, the amount of block copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE\text{-}fraction} \quad \text{Eq. 7}$$

Where
$w_{PP-diblock}$=weight fraction of PP in the diblock separated with the PE-fraction by HTLC (Equation 6)
$w_{PP}$=weight fraction of PP in the polymer
$W_{PE\text{-}fraction}$=weight fraction of PE separated from HTLC, containing the diblock and unbound PE (Equation 5)

For example, if an iPP-PE polymer contains a total of 62.5 wt % C3 and is made under the conditions to produce an PE polymer with 10 wt % C3 and an iPP polymer containing 97.5 wt % C3, the weight fractions of PE and PP are 0.400 and 0.600, respectively (as calculated using Equation 2). Since the percent of PE is 40.0 wt % and the iPP is 60.0 wt %, the relative ratio of the PE:PP blocks is expressed as 1:1.5.

Hence, if one skilled in the art, carries out an HTLC separation of the polymer and isolates 28 wt % PP and 72 wt % of the PE fraction, this would be an unexpected result and this would lead to the conclusion that a fraction of block copolymer was present. If the C3 content of the PE fraction (wt % $C_{3PE\text{-}fraction}$) is subsequently calculated to be 48.9 wt % C3 from equations 4 and 5, the PE fraction containing the additional propylene has 0.556 wt fraction of PE polymer and 0.444 weight fraction of PP polymer ($w_{PP-diblock}$, calculated using Equation 6).

Since the PE fraction contains 0.444 weight fraction of PP, it should be attached to an additional 0.293 weight fraction of PE polymer based on the iPP:PE block ratio of 1.5:1. Thus, the weight fraction of diblock present in the PE fraction is 0.741; further calculation of the weight fraction of diblock present in the whole polymer is 0.533. For the entire polymer, the composition is described as 53.3 wt % iPP-PE diblock, 28 wt % PP polymer, and 18.7 wt % PE polymer. The crystalline block composite index (CBCI) is the estimated weight fraction of diblock present in the whole polymer. For the example described above, the CBCI for the crystalline block composite is 0.533.

The Crystalline Block Composite Index (CBCI) provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification.

The calculation of CBCI is based on the analytical observation that the amount of free CAOP is lower than the total amount of CAOP that was produced in the polymerization. The remainder of the CAOP is bound to CEB to form the diblock copolymer. Because the PE fraction separated by HTLC contains both the CEP and the diblock polymer, the observed amount of propylene for this fraction is above that of the CEP. This difference can be used to calculate the CBCI.

Based solely on the analytical observations without prior knowledge of the polymerization statistics, the minimum and maximum quantities of block copolymer present in a polymer can be calculated, thus distinguishing a crystalline block composite from a simple copolymer or copolymer blend.

The upper bound on the amount of block copolymer present within a crystalline block composite, $w_{DB_{Max}}$, is obtained by subtracting the fraction of unbound PP measured by HTLC from one as in Equation 8. This maximum assumes that the PE fraction from HTLC is entirely diblock and that all crystalline ethylene is bound to crystalline PP with no unbound PE. The only material in the CBC that is not diblock is that portion of PP separated via HTLC.

$$w_{DB_{Max}} = 1 - w_{PP_{isolated}} \quad \text{Eq. 8}$$

The lower bound on the amount of block copolymer present within a crystalline block composite, $w_{DB_{Min}}$, corresponds to the situation where little to no PE is bound to PP. This lower limit is obtained by subtracting the amount of unbound PP as measured by HTLC from the total amount of PP in the sample as shown in Equation 9.

$$w_{DB_{Min}} = w_{PP} - w_{PP_{isolated}} \quad \text{Eq. 9}$$

Furthermore, the crystalline block composite index will fall between these two values:

$$w_{DB_{Min}} < CBCI \leq w_{DB_{Max}}.$$

Based on the polymerization mechanism for production of the crystalline block composites, the CBCI represents the best estimate of the actual fraction of diblock copolymer in the composite. For unknown polymer samples, $w_{DB_{Min}}$ can be used to determine if a material is a crystalline block composite. Consider the application of this analysis to homopolymers, copolymers or blends. For a physical blend of PE and PP, the overall weight fraction of PP should be equal to that of the wt % PP from HTLC and the lower bound on diblock content, Equation 9, is zero. If this analysis is applied to a sample of PP that does not contain PE both the weight fraction of PP and amount of PP obtained from HTLC are 100% and again the lower bound on diblock content, Equation 9, is zero. Finally if this analysis is applied to a sample of PE that does not contain PP then both the weight fraction of PP and weight fraction PP recovered via HTLC are zero and the lower bound on diblock, Equation 9, is zero. Because the lower bound on diblock content is not greater than zero in any of these three cases, these materials are not crystalline block composites.

Scanning Electron Microscopy

The plaques used for microtensile test are examined by SEM for phase morphology. An initial test piece of plaque around 1 cm×1 cm×1.8 mm is cut from the plaque. The cut piece is sectioned in thickness direction at −120° C. using a diamond knife on a Leica UCT microtome to obtain a microtomed block surface. The microtomed blocks are placed in a glass dish and the microtomed surface is post-stained for 10 minutes with a 0.5% aqueous ruthenium tetra oxide (RuO4) stock solution (purchased from Electron Microscopy Sciences) at an ambient temperature. This is followed by coating the stained block surface with iridium for 20 seconds at a current of 20 mA under Argon atmosphere using an "Emitech KX575" plasma coater in order to render the specimen conductive under the electron beam. An FEI Nova 600 scanning electron microscope operated at an accelerating voltage of 7 kV, a 6 mm working distance, spot size 4 is used to capture backscatter and secondary electron images.

Transmission Electron Microscopy

The compression molded plaques used for microtensile test are examined by TEM. The samples are trimmed so that sections could be collected near the core of thickness of the sample. The trimmed samples are cryopolished at −60° C. to prevent smearing using a diamond knife on a Leica UCT microtome prior to staining. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate (RuCl3×H2O) into a glass bottle with a screw lid and adding 10 ml of 5.25% aqueous sodium hypochlorite to the jar. The samples are attached to a glass slide using double sided tape. The slide is placed in the jar in order to suspend the blocks about 1 inch above the staining solution for 3 hr. Sections of approximately 100 nanometers in thickness are collected from the stained sample at ambient temperature using a diamond knife on a Leica EM UC6 microtome and placed on 600 mesh virgin TEM grids for observation. TEM images are collected using a JEOL JEM-1230 operated at 100 kV accelerating voltage and photographed using a Gatan-791 and 794 digital cameras.

Image analysis is performed using Leica LAS3 software on 10kX TEM images. In order to allow for binary image generation, manual tracing of the features from the TEM prints is carried out using a black sharpie marker. The traced TEM images are scanned using a Hewlett Packard Scanjet G3110 to generate digital images. The digital images are imported into the Leica LAS3 program and converted to binary images by setting a gray-level threshold to include the features of interest. After the features in the images are measured, the sizing data are exported into an Excel spreadsheet that is used to calculate average equivalent circular diameter.

Experimental

TABLE 1

Description of materials

| Material | Description |
| --- | --- |
| DOWLEX ™ 2036 | Linear Low Density Polyethylene (LLDPE), 2.5 g/10 min MI (@190° C.), 0.935 g/cc density (The Dow Chemical Company) |
| PP DH 375 | Polypropylene (homo-PP), 4 g/10 min MFR (@230° C.) (The Dow Chemical Company) |
| OBC | INFUSE ™ 9807 ethylene octene block copolymer, Density = 0.866 g/cc, MI = 15 g/10 min (@190° C.) (The Dow Chemical Company) |
| CBC2 | EP/iPP (50/50 wt/wt), 90 wt % $C_2$ in EP, 3.6 MFR (@ 230° .C) |
| BC1 | EP/iPP (50/50 wt/wt), 65 wt % $C_2$ in EP, 4.1 MFR (@ 230° C.) |
| Polyurethane (PU) | Containing 85 part Polyol, 55 part MDI and 200 part $CaCO_3$ |
| Polyamide (PA) | Ultramid ® C33 L01(BASF) |
| Polyethylene terephthalate (PET) | Polyclear ® PET 1101 (Invista) |
| MAH-g-LDPE | AMPLIFY ™ GR202 (1.2 wt. % MAH) (The Dow Chemical Company) |
| MAH-g-PP | Orevac ® CA100 (1.0 wt. % MAH) (Arkema Inc.) |
| POX | 2,5-Dimethyl-2,5-di(t-butylperoxy) hexane, CAS# 78-63-7, LUPEROX 101 dialkyl peroxide, supplied by Aldrich |
| MAH | Maleic anhydride (CAS# 108-31-6, 98+% from Alfa Aesar) |
| MEK | Methyl ethyl ketone (CAS# 78-93-3, 2-Butanone from Sigma-Aldrich) |
| DEDA (amine) | 2-ethylaminoethylamine (CAS# 110-72-5) supplied by Aldrich |
| B225 | Anti-oxidant Ciba ® IRGANOX ® B 225: a mixture of 50% IRGAFOS 168 and 50% IRGANOX 1010 |

Preparation of PU

| | Parts by weight | |
| --- | --- | --- |
| VORANOL 9120A | 85 | 2000 MW polyoxypropylene polyether diol |
| Dipropylene glycol | 15 | Chain extender |
| Georgia Marble CC-103 | 200 | Calcium carbonate filler |
| Molsiv 5A | 2 | 5 angstrom powdered molecular sieve |
| BYK W961 | 1 | Filler dispersing agent |
| Dibutyltin sulfide | 0.06 | Catalyst |
| Index | 115 | Ratio of isocyanate groups to hydroxyl groups - this is 15% excess isocyanate |
| ISONATE 7594 | 55.2 | Modified MDI |

Initially, the filler and molecular sieves are added to the polyols, chain extender, and filler dispersant. The MDI is thoroughly mixed with the polyol/filler, then the catalyst is added and mixed. The reaction mixture is poured onto a glass plate covered with a PTFE foil and cast with a knife with a 30-mil gap to produce a film. The coated glass plate is placed in an oven at 120 C to cure.

Synthesis of Crystalline Block Composite

Catalyst-1 ([[rel-2',2'''-[(1R,2R)-1,2-cylcohexanediylbis(methyleneoxy-O)]bis[3-(9H-carbazol-9-yl)-5-methyl[1,1'-biphenyl]-2-olato-O]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The crystalline block composite of the present Examples is designated CBC2. It is prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor. Table 3 shows the analytical characteristics of CBC2.

Synthesis of Block Composites

The Block Composite samples are synthesized in dual reactors in series in a similar fashion to the Crystalline Block Composite samples. The first reactor in each case was approximately 12 gallons in volume while the second reactor was approximately 26 gallons. The process conditions are contained in Table 2.

TABLE 2

Reactor process conditions to produce CBC2 and BC1.

| | CBC2 | | BC1 | |
|---|---|---|---|---|
| | 1st reactor | 2nd reactor | 1st reactor | 2nd reactor |
| Reactor Control Temp. (° C.) | 118 | 110 | 95 | 105 |
| Solvent Feed (lb/hr) | 145 | 145 | 145 | 145 |
| Propylene Feed (lb/hr) | 2.3 | 31 | 11 | 30 |
| Ethylene Feed (lb/hr) | 27.8 | 0 | 20 | 0 |
| Reactor Propylene Conc. (g/L) | 1.04 | 2.03 | 1.72 | 2.08 |
| Catalyst Efficiency ($g_{Poly}/g_M$)*10$^6$ | 5.12 | 0.16 | 15 | 19 |
| Catalyst Flow (lb/hr) | 1.16 | 0.95 | 4.55 | 0.20 |
| Catalyst Conc. (ppm) | 5 | 200 | 0.15 | 0.74 |
| Cocatalyst-1 Flow (lb/hr) | 1.50 | 0.93 | 45 | 196 |
| Cocat.-2 Flow (lb/hr) | 0.91 | 0 | 0.3 | 0.73 |
| DEZ Flow (lb/hr) | 1.10 | 0 | 300 | 2000 |
| Production Rate (lb/hr) | 29 | 31 | 30 | 30 |

TABLE 3

CBC2 and BC1 physical properties

| Example | MFR (230° C./2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) | Tg (° C.) |
|---|---|---|---|---|---|---|---|---|---|
| CBC2 | 3.6 | 13.2 | 146 | 2.76 | 46.7 | 130 (114) | 97 | 126 | −11 |
| BC1 | 4.1 | 21.5 | 133 | 2.35 | 33.8 | 139 (40) | 93 | 66 | −44 |

The ratio of iPP to LLDPE in CBC2 is 49 to 51. The estimated crystalline block composite index is 0.729. The ratio of iPP to EP in BC1 is 50 to 50. The estimated block composite index is 0.413.

FIG. 1 shows the DSC profile for CBC2. The DSC profile shows a melting peak at 129° C. which is representative of the CAOP and CAOB and 113° C. which corresponds to the CEP and CEB. The observed melt enthalpy was 115 J/g and glass transition temperature was observed at −11° C.

Figure 2:
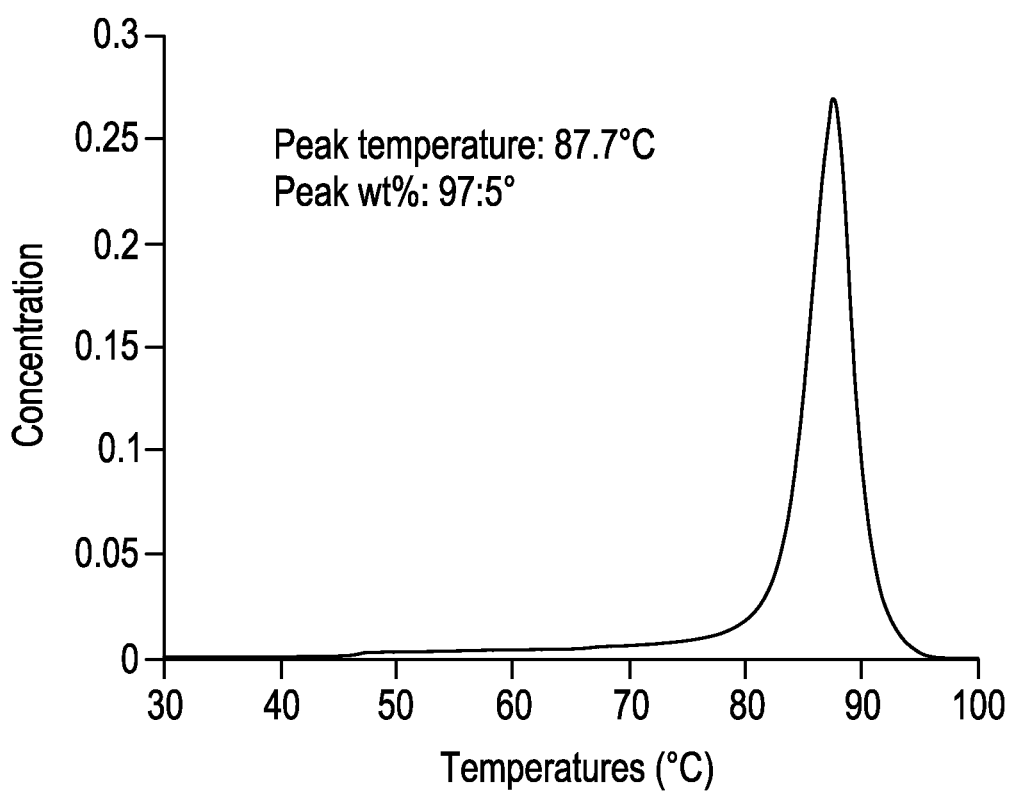
FIG. 2 shows the TREF analysis of CBC2

FIG. 2 shows the TREF analysis of CBC2. The TREF elution profile shows that CBC2 is highly crystalline and in contrast to the DSC melting profile, shows little or no separation of the CEP and CAOP or the block copolymer. Only 2.4 wt % purge was measured which also indicates the very high crystallinity of components in CBC2.

Figure 3:
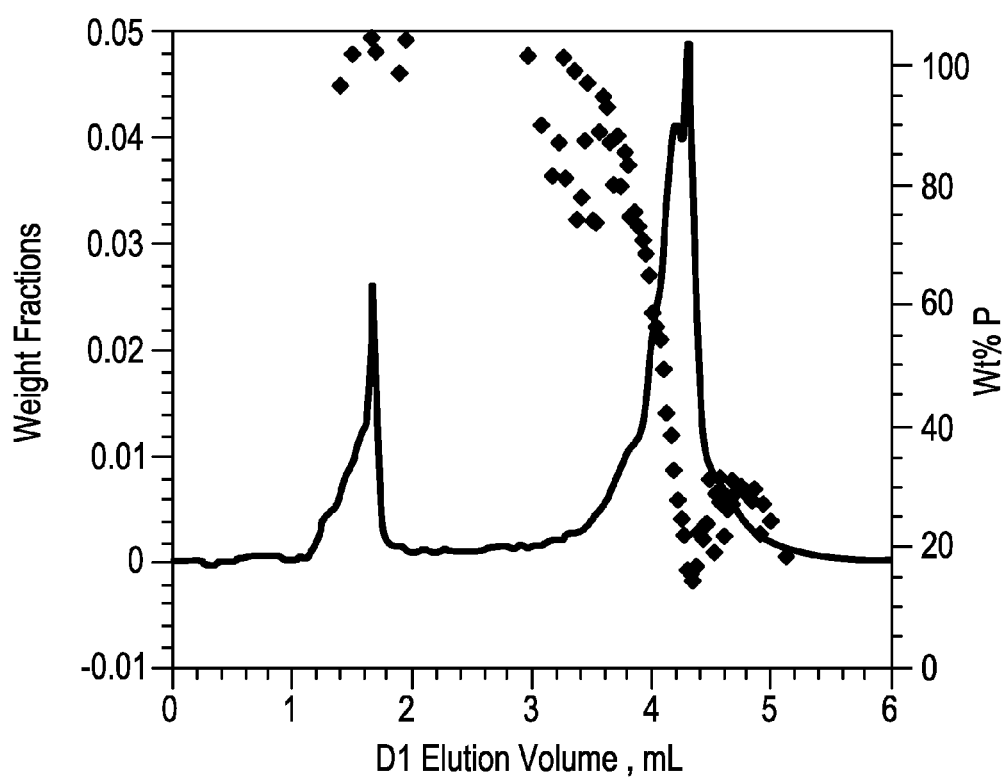
FIG. 3 shows HTLC analysis of CBC2.

FIG. 3 shows HTLC analysis of CBC2. The elution profile of CBC2 by HTLC showed that 13.2 wt % of an early eluting peak between 1-2 mL and 86.8 wt % of a later eluting peak between 3-5 mL was eluted. From the concentration and composition measurement, it is determined that the early eluting peak was isolated PP which is CAOP and representative of the CAOB. This is shown by the composition profile of the wt % of C3 present. The second peak and later eluting peak is rich in C2 and shows a gradient of C3. It can be interpreted that this peak is the PE phase and contains the block copolymer and CEP. The composition gradient shows that the block copolymer is eluted earlier and the CEP is eluted last.

Preparation of MAH-g-CBC2-4

A Coperion ZSK-25MC twin screw extruder is used for the reactive extrusion process to functionalize the base plastic resins. The 25-mm diameter extruder was equipped with 12 barrel segments for a total length to diameter ratio of 48. There are 11 independently controlled barrel sections with electric heating and water cooling. Polymer pellets are fed to the main extruder hopper in barrel 1 using a K-tron Model KCLQX3 loss-in-weight feeder. The liquid reactants were injected into the third barrel section of the extruder using a HPLC precision metering pump (Alltech Model 627 HPLC pump). A dialkyl organic peroxide (Luperox 101, CAS#78-63-7) is used as the initiator.

The liquid feed to the extruder included a solvent blend containing both the maleic anhydride monomer and the organic peroxide. In order to improve the accuracy of the feeding, both the peroxide and maleic anhydride powder were dissolved in methylethylketone (MEK) solvent. 300 grams of maleic anhydride crystals were weighted out and placed into a 2-liter plastic container with a sealable lid. An equal weight of MEK solvent was weighted out on a scale, and added to the container with the maleic anhydride. The blend was left in the laboratory hood with a magnetic stir bar to assist in dissolving the maleic anhydride into the solvent. The ratio of maleic anhydride to peroxide was held constant for the experimental samples at 0.02 parts peroxide and 0.9 parts maleic anhydride. In order to minimize the time when the peroxide and monomer are mixed together, the peroxide were dissolved in the previously made MEK/maleic anhydride solution immediately before moving the blend to the inlet of the positive displacement pump. The HPLC injection rate was 9.07 g/min. Typical injection pressures for the liquids were 115-160 psi. The MEK solvent, unreacted maleic anhydride and volatile compounds were removed via the vacuum line-trap system at the devolatilization port in barrel 11. The vacuum system was operated at 508 mm Hg vacuum. The melt was pelletized using a GALA LPU underwater pelletization system. A two-hole die was used with 7.2° C. water temperature and a cutter speed of 1700 rpm. The polymer feed rate to the process was 6.80 kg/h with a fixed extruder screw speed of 500 rpm and a motor torque load of 55-65%.

The formulations used for grafting maleic anhydride (MAH) to CBC2 are shown in Table 3. Process conditions for production of MAH grafted CBC2 are shown in Table 4. Characterizations of MAH-g-CBC2 are shown in Table 5.

Figure 4:
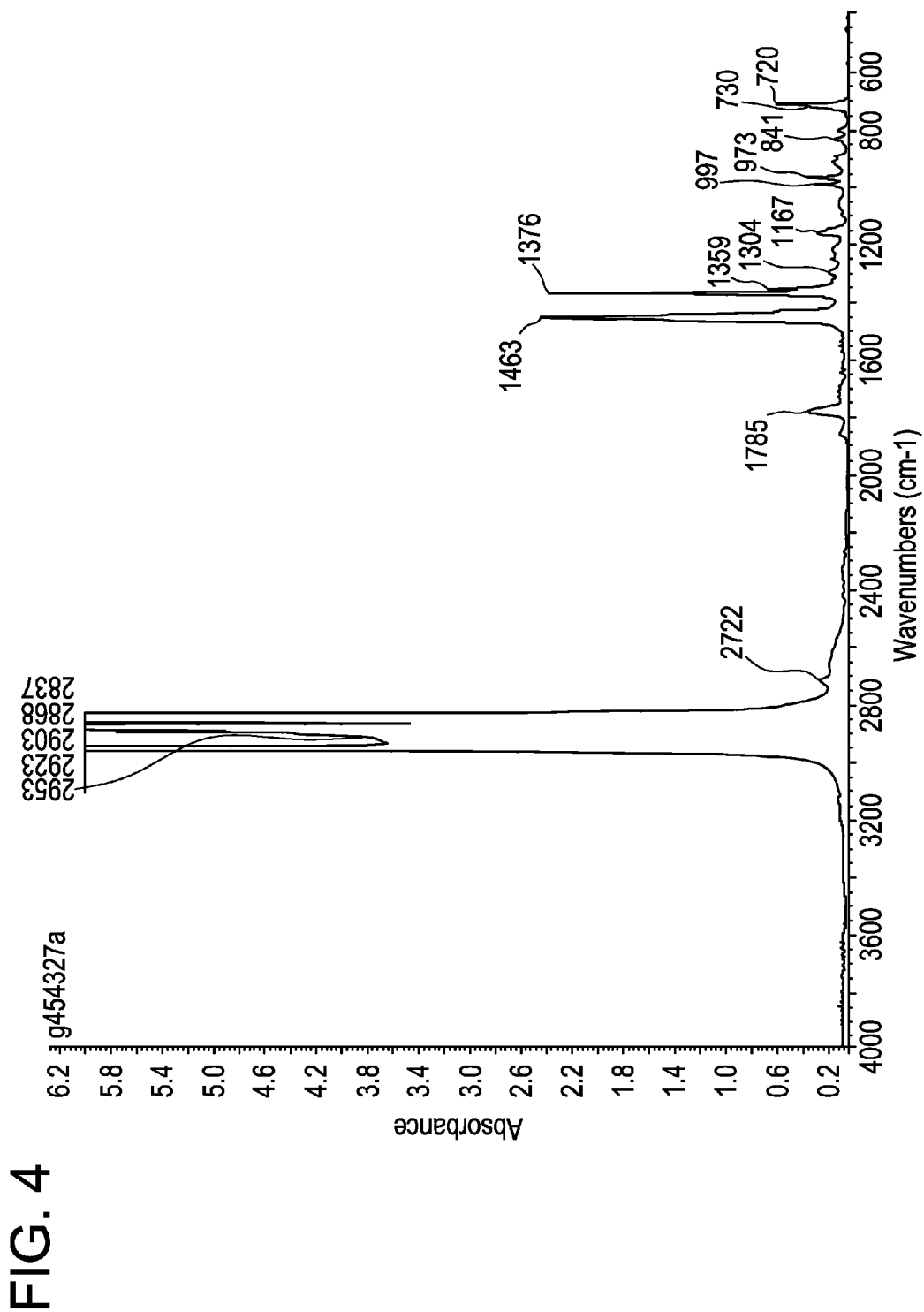
FIG. 4 shows the IR spectrum for MAH-g-CBC2-4.
Figure 5:
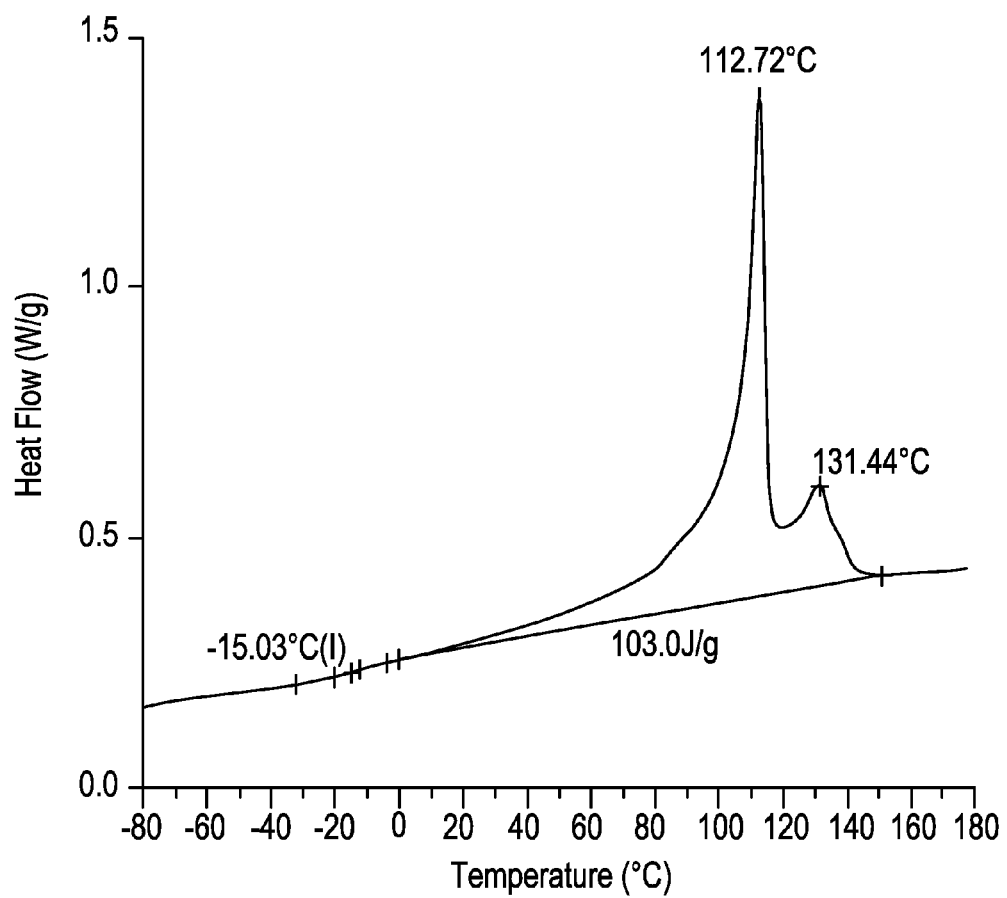
FIG. 5 shows the DSC profile for MAH-g-CBC2-4.
Figure 6:
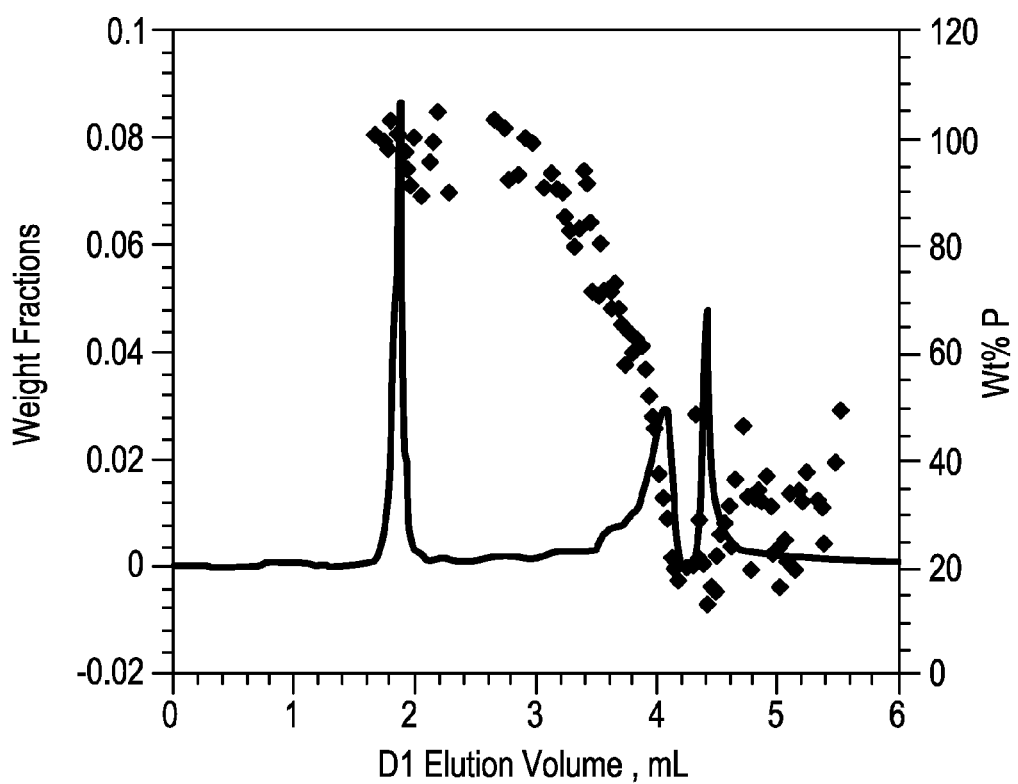
FIG. 6 shows HTLC analysis of MAH-g-CBC2-4.

An IR spectrum for MAH-g-CBC2-4 is shown in FIG. 4. The anhydride peak can be seen at 1785 cm$^{-1}$. A typical thermogram for MAH-g-CBC2-4 is shown in FIG. 5. The DSC profile shows a melting peak at 131° C. which is representative of the CAOP and CAOB and 113° C. which corresponds to the CEP and CEB. The observed melt enthalpy was 103 J/g. A typical HTLC for MAH-g-CBC2-4 is shown in FIG. 6. The elution profile of CBC2 by HTLC showed that 29 wt % of an early eluting peak between 1.6-2.2 mL and 71 wt % of a later eluting peak between 3-5 mL was eluted. From the concentration and composition measurement, it is determined that the early eluting peak was isolated PP which is CAOP and representative of the CAOB. This is shown by the composition profile of the wt % of C3 present. The second peak and later eluting peak is rich in C2 and shows a gradient of C3. It can be interpreted that this peak is the PE phase and contains the block copolymer and CEP. The composition gradient shows that the block copolymer is eluted earlier and the CEP is eluted last

TABLE 4

MAH grafting formulation and resin properties

| | Feed (wt %) | | | |
|---|---|---|---|---|
| Description | CBC or BC | MAH | POX | MEK |
| MAH-g-CBC2-1 | 98.18 | 0.90 | 0.02 | 0.90 |
| MAH-g-CBC2-2 | 96.36 | 1.80 | 0.04 | 1.80 |
| MAH-g-CBC2-3 | 94.54 | 2.70 | 0.06 | 2.70 |
| MAH-g-CBC2-4 | 92.72 | 3.60 | 0.08 | 3.60 |
| MAH-g-BC1 | 95.80 | 2.00 | 0.20 | 2.00 |

TABLE 5

Process Conditions for Production of MAH grafted Polymer Samples

| | Sample No. | | | | | | | | | |
|---|---|---|---|---|---|---|---|---|---|---|
| | MAH-g-CBC2-1 | | MAH-g-CBC2-2 | | MAH-g-CBC2-3 | | MAH-g-CBC2-4 | | MAH-g-BC1 | |
| #1 Pellet Feed Rate [kg/h] | 6.80 | | 6.80 | | 6.80 | | 6.80 | | 6.80 | |
| HPLC [g/min] | 2.2 | | 4.29 | | 6.47 | | 9.07 | | 4.8 | |
| Screw RPM | 500 | | 500 | | 500 | | 500 | | 500 | |
| | SP | Actual | SP | Actual | SP | Actual | SP | Actual | SP | Actual |
| Zone #1 [° C.] | 120 | 112 | 120 | 112 | 120 | 112 | 120 | 112 | 120 | 118 |
| Zone #2 [° C.] | 200 | 200 | 200 | 200 | 200 | 200 | 200 | 200 | 200 | 200 |
| Zone #3 [° C.] | 200 | 200 | 200 | 200 | 200 | 200 | 200 | 200 | 200 | 202 |
| Zone #4 [° C.] | 200 | 200 | 200 | 200 | 200 | 200 | 200 | 200 | 200 | 200 |
| Zone #5 [° C.] | 200 | 200 | 200 | 200 | 200 | 200 | 200 | 200 | 200 | 190 |
| Zone #6 [° C.] | 200 | 202 | 200 | 198 | 200 | 201 | 200 | 200 | 200 | 201 |
| Zone #7 [° C.] | 200 | 200 | 200 | 200 | 200 | 200 | 200 | 200 | 200 | 200 |
| Zone #8 [° C.] | 200 | 200 | 200 | 200 | 200 | 200 | 200 | 200 | 200 | 200 |
| Zone #9 [° C.] | 200 | 200 | 200 | 200 | 200 | 200 | 200 | 200 | 200 | 201 |
| Zone #10 [° C.] | 200 | 200 | 200 | 200 | 200 | 200 | 200 | 200 | 200 | 200 |
| Zone #11 [° C.] | 200 | 200 | 200 | 200 | 200 | 200 | 200 | 200 | 160 | 172 |
| Divert Valve [C] | 200 | 200 | 200 | 200 | 200 | 200 | 200 | 200 | — | NA |
| Gala Die [° C.] | 210 | 210 | 185 | 185 | 185 | 185 | 185 | 185 | — | NA |
| Gala RPM | 1700 | | 1700 | | 1700 | | 1700 | | NA | |

TABLE 5-continued

Process Conditions for Production of MAH grafted Polymer Samples

| | | | | | |
|---|---|---|---|---|---|
| Gala water temp (° C.) | 12.2 | 7.2 | 7.2 | 7.2 | NA |
| Torque % | 55 | 56 | 63 | 62 | 50 |
| Die pressure (MPa) | 3.28 | 3.25 | 3.08 | 3.31 | 0.1 |

TABLE 6

Characterizations of MAH-g-CBC2 and MAH-g-BC1

| Description | MFR (2.16 kg, 230° C.) | Grafting level MAH wt % | Wt % PP From HTLC Separation | Tm (° C.) Peak 1 (Peak 2) | Tc (° C.) | Melt Enthalpy (J/g) |
|---|---|---|---|---|---|---|
| MAH-g-CBC2-1 | 3.4 | 0.15 | n/m | n/m | n/m | n/m |
| MAH-g-CBC2-2 | 2.7 | 0.28 | 24 | 131 (113) | 97 | 105 |
| MAH-g-CBC2-3 | 1.2 | 0.45 | n/m | n/m | n/m | n/m |
| MAH-g-CBC2-4 | 0.71 | 0.64 | 29 | 131 (113) | 95 | 103 |
| MAH-g-BC1 | 15.9 | 1.01 | 35 | 140 (42) | 98 | 62 |

Preparation of MAH Grafted OBC (MAH-g-OBC)

A ZSK-92 Megacompounder with 11 barrels (45 L/D) is used to graft MAH on OBC. The OBC resin is fed with K-Tron T-60 feeder. MAH is injected at barrel 3, port 1 using a Lewa pump. The peroxide/oil mixture (50/50 wt/wt) was injected at barrel 3, port 2 using a Prominent Sigma plunger pump. The barrel temperature is set at 80° C. for zone 1 and 225° C. for zone 2 to 11. A vacuum pump system is used for devolatilization at barrel 9. A minimum of 20 inches Hg is used. The screw RPM is at 200 to 230, the torque ranges from 56% to 61%. The feed rate for OBC1 is set at 1500 lb/hr. The feed formulation is 1.70% MAH, 0.2% peroxide/mineral oil (50/50, wt/wt) mixture. The final MAH grafting level is 0.95% and melt index of MAH-g-OBC is 8.0 (2.16 kg, 190° C.).

Converting MAH-g-CBC2 to Imide-g-CBC2 (Representative Preparation of Imide-g-CBC2-4)

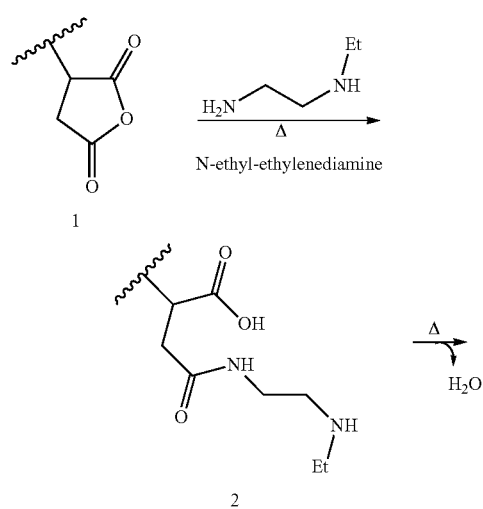

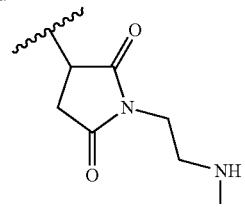

MAH-g-CBC2-2 and MAH-g-CBC2-4 are converted imide-g-CBC2-2 and imide-g-CBC2-4, respectively. The unit used to convert MAH-g-CBC2 to DEDA grafted version is a Thermo Haake Polylab, Model 557-9301 (the drive unit) and Haake Rheomix 3000p, Model 557-1306 (with roller mixing rotors). Control is from a Dell Pentium 4 computer (Model DHM, S/N 9D56K21) running Windows 2002 with proprietary Haake software that controls automated operation of Polylab drive unit and Rheomix mixing bowls and acquires data.

For Imide-g-CBC2-4, 195 g of maleated resin (MAH-g-CBC2-4) is weighed into 16 oz., wide mouthed glass jars then warmed in an oven at 50° C. temperature for 30 minutes. Three molar equivalents of DEDA (n-ethylethylenediamine) per mol of anhydride is added by gas-tight syringe into the jars. Specifically, 6.3 ml of DEDA (5.23 g) is added. Jars are shaken to distribute the amine, capped lightly with Teflon lined lids and returned to the oven for 1 hr. The jars are removed, shaken again, lids secured with electrical tape and placed inside a 1-gallon wide mouthed HDPE jug as a secondary container. The glass bottles are padded with brown crepe paper to keep them from rolling within the secondary jars. Lids of the secondary containers are sealed with electrical tape then put on a Stovall low profile powered roller unit set to maximum rolling speed. Jars are rolled for 2 days. When checked the next day there was still some visible "loose" liquid on the sides so returned the jars to the 50° C. oven for 2 hours. Samples are again put in 50° C. oven for at least 3 hours before running.

Figure 7:
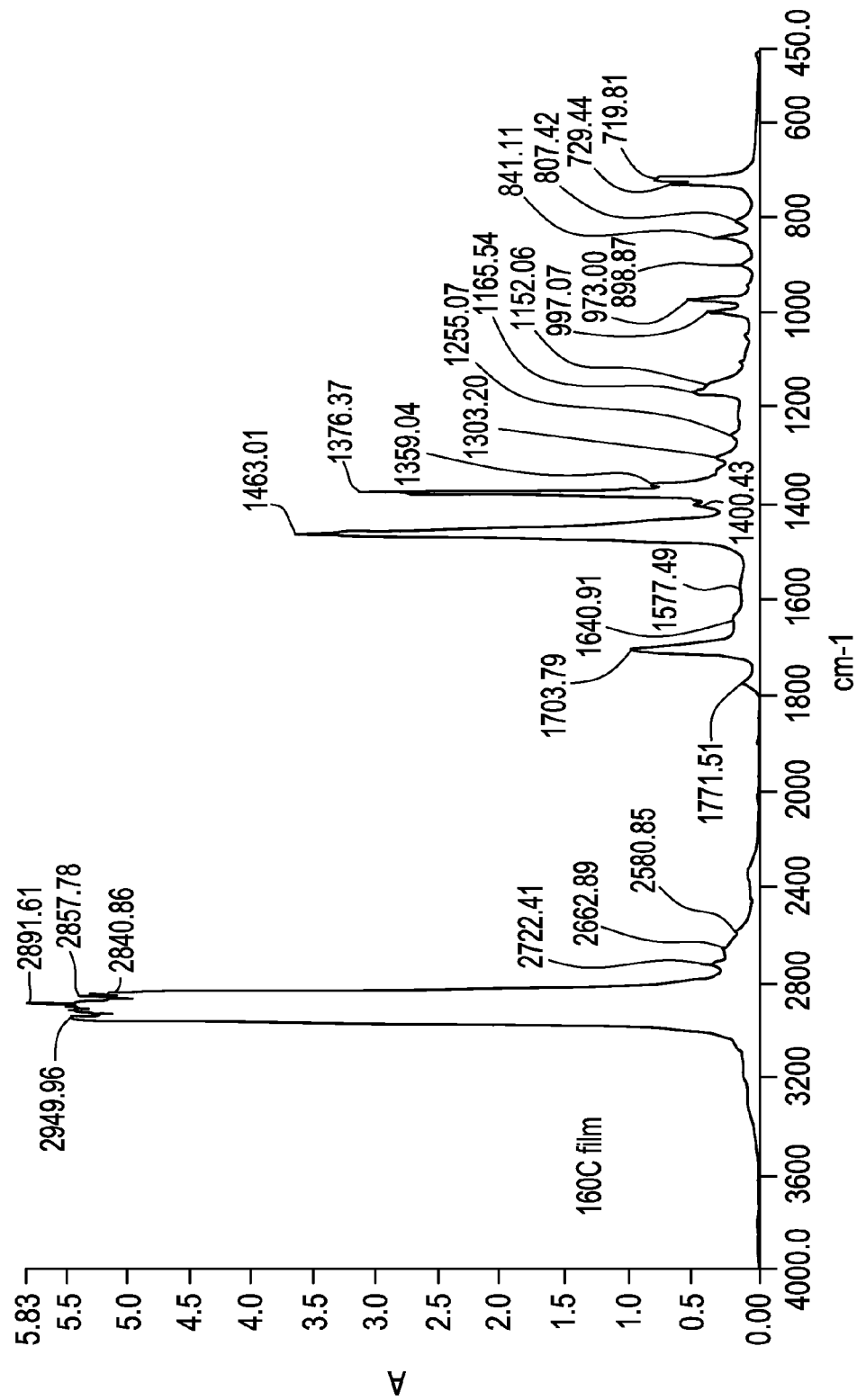
FIG. 7 shows the IR spectrum for Imide-g-CBC2-4.

Haake unit is set to 170° C., allowed to equilibrate and the rotors are calibrated at 100 RPM rotor speed. Imbibed pellets are added to mix bowl and ran for 10 minutes after feed ram secured in closed position. The bowl is opened; sample removed and allowed to cool on Teflon sheet. Films of raw samples (about 3 mil thick) are pressed at 160° C. using Carver hydraulic press and checked by FTIR (Perkin-Elmer Spectrum One) for conversion. Samples are then dried under vacuum at 120° C. for overnight. An IR spectrum for Imide-g-CBC2-4 is shown in FIG. 7. The anhydride (1785-1790 $cm^{-1}$) band is transformed to the imide band at 1700-1710 $cm^{-1}$ after reaction with the diamine. The disappearance of anhydride band and formation of imide band indicate the reaction is complete.

Figure 8:
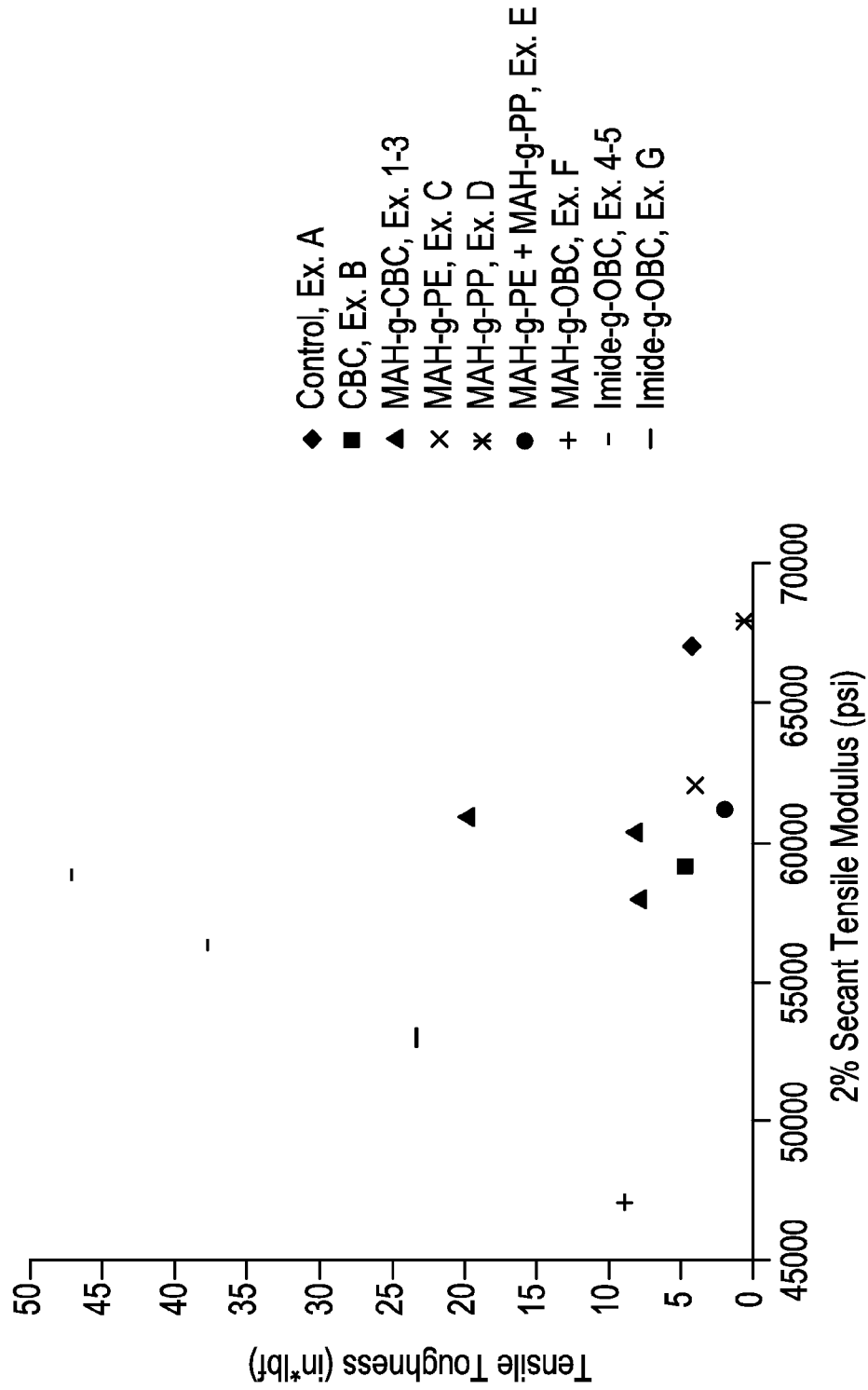
FIG. 8 shows toughness vs modulus for the PE/PP/PA blends data in Table 8.

The blends compatibilized with amine-g-CBC2 (4 and 5) gave the best ultimate elongation and toughness without losing stress at yield vs A and B. The initial MAH grafting level did not appear to affect the effectiveness of amine-g-CBC2-significantly. The MAH-g-CBC2-(1, 2, 3) also showed good improvement of tensile elongation and toughness relative to comparative example C, D and E. The MAH-g-OBC (F) and amine-g-OBC (G) showed improvements in tensile elongation and toughness, but caused significant reduction in stress at yield and modulus. This is due to the low modulus of the OBC material. The toughness/modulus plot is shown in FIG. 8.

TABLE 7

Blending compositions mimicking artificial turf composition

| Example | LDPE | PP | PU | CBC2- | MAH-g-CBC2-2 | MAH-g-CBC2-3 | MAH-g-CBC2-4 | MAH-g-PE | MAH-g-PP | MAH-g-OBC | Amine-g-CBC2-4 | Amine-g-CBC2-2 | Amine-g-OBC |
|---|---|---|---|---|---|---|---|---|---|---|---|---|---|
| A | 75 | 10 | 15 | — | — | — | — | — | — | — | — | — | — |
| B | 68.2 | 9.1 | 13.6 | 9.1 | — | — | — | — | — | — | — | — | — |
| 1 | 68.2 | 9.1 | 13.6 | — | 9.1 | — | — | — | — | — | — | — | — |
| 2 | 68.2 | 9.1 | 13.6 | — | — | 9.1 | — | — | — | — | — | — | — |
| 3 | 68.2 | 9.1 | 13.6 | — | — | — | 9.1 | — | — | — | — | — | — |
| C | 68.2 | 9.1 | 13.6 | — | — | — | — | 9.1 | — | — | — | — | — |
| D | 68.2 | 9.1 | 13.6 | — | — | — | — | — | 9.1 | — | — | — | — |
| E | 68.2 | 9.1 | 13.6 | — | — | — | — | 4.5 | 4.5 | — | — | — | — |
| F | 68.2 | 9.1 | 13.6 | — | — | — | — | — | — | 9.1 | — | — | — |
| 4 | 68.2 | 9.1 | 13.6 | — | — | — | — | — | — | — | 9.1 | — | — |
| 5 | 68.2 | 9.1 | 13.6 | — | — | — | — | — | — | — | — | 9.1 | — |
| G | 68.2 | 9.1 | 13.6 | — | — | — | — | — | — | — | — | — | 9.1 |

Converting MAH-g-OBC to Imide-g-OBC

For converting MAH-g-OBC to Imide-g-OBC, 190 g of MAH-g-OBC is weighed into 16 oz., wide mouthed glass jars then warmed in an oven at 50° C. temperature for 30 minutes. 6.1 ml of DEDA (5.12 g) is added by gastight syringe into the jars. The rest follows the same procedure as converting MAH-g-CBC2 to Imide-g-CBC2.

Blend Preparation

The compounding of polymeric components and compatibilizer is performed on Haake Rheomix 600p mixer) rotating at 50 RPM. The mixer is preheated to 190° C. for PU blends, 230° C. for polyamide blends and 275° C. for PET blends. Polyamide and PET is dried at 80° C. overnight in a vacuum oven before use. The mixing is kept for 5 min after the ram is secured down. Additional 0.2% (based on 45 gram) antioxidant B225 is added to each of the formulations.

1. LLDPE/PP/PU Blends with 15 Wt % PU Based on Sum Weight of LLDPE+PP+PU

A total weight of 45 gram of ingredients is added to the mixer according to the compositions shown in the Table 6. These PE/PP/PU ratios mimic the actual artificial turf composition. The tensile properties are shown in Table 7.

TABLE 8

Tensile properties of blends (artificial turf composition)

| Example | Run | Ult elongation (%) | Toughness (in*lbf) | 2% Secant Modulus (psi) | Stress at yield (psi) |
|---|---|---|---|---|---|
| A | 1 | 33 | 4.3 | 67017 | 2484 |
| B | 2 | 38 | 4.8 | 59158 | 2293 |
| 1 | 3 | 156 | 20.0 | 60882 | 2537 |
| 2 | 4 | 63 | 8.1 | 57982 | 2438 |
| 3 | 5 | 63 | 8.4 | 60362 | 2490 |
| C | 6 | 31 | 4.1 | 62078 | 2459 |
| D | 7 | 7 | 0.7 | 67947 | 2454 |
| E | 8 | 15 | 2.0 | 61220 | 2360 |
| F | 9 | 84 | 9.0 | 47087 | 1986 |
| 4 | 10 | 395 | 47.7 | 58561 | 2394 |
| 5 | 11 | 340 | 38.3 | 56173 | 2312 |
| G | 12 | 115 | 23.9 | 53033 | 1967 |

2. LLDPE/PP/PU Blends with 33.3 Wt % PU Based on Sum Weight of LLDPE+PP+PU

In this example, the PE, PP and PU ratio is balanced, which is a worst case scenario for compatibilization. The blend compositions are shown in Table 9. The tensile properties are shown in Table 10.

TABLE 9

Blending compositions (PE/PP/PU ratio 1/1/1, worst case scenario)

| Example | LDPE | PP | PU | CBC2-g-MAH2 | CBC2-g-MAH4 | PE-g-MAH | PP-g-MAH | MAH-g-OBC | Amine-g-CBC2-4 | Amine-g-CBC2-2 | Amine-g-OBC |
|---|---|---|---|---|---|---|---|---|---|---|---|
| H | 33.3 | 33.3 | 33.3 | — | — | — | — | — | — | — | — |
| 6 | 30 | 30 | 30 | — | 10 | — | — | — | — | — | — |

TABLE 9-continued

Blending compositions (PE/PP/PU ratio 1/1/1, worst case scenario)

| Example | LDPE | PP | PU | CBC2-g-MAH2 | CBC2-g-MAH4 | PE-g-MAH | PP-g-MAH | MAH-g-OBC | Amine-g-CBC2-4 | Amine-g-CBC2-2 | Amine-g-OBC |
|---|---|---|---|---|---|---|---|---|---|---|---|
| 7 | 30 | 30 | 30 | — | — | — | — | — | 10 | — | — |
| 8 | 30 | 30 | 30 | 10 | — | — | — | — | — | — | — |
| 9 | 30 | 30 | 30 | — | — | — | — | — | — | 10 | — |
| I | 30 | 30 | 30 | — | — | 5 | 5 | — | — | — | — |
| J | 30 | 30 | 30 | — | — | — | — | 10 | — | — | — |
| K | 30 | 30 | 30 | — | — | — | — | — | — | — | 10 |

TABLE 10

Tensile properties of blends (PE/PP PU ratio 1/1/1, worst case scenario)

| Example | Ult elongation (%) | Toughness (in*lbf) | 2% Secant Modulus (psi) |
|---|---|---|---|
| H | 5.6 | 0.6 | 1430 |
| 6 | 20.2 | 3.3 | 1475 |
| 7 | 57.8 | 9.1 | 1541 |
| 8 | 7.2 | 0.9 | 1386 |
| 9 | 59.6 | 8.5 | 1285 |
| I | 7.4 | 1.0 | 1422 |
| J | 10.8 | 1.1 | 898 |
| K | 25.8 | 5.2 | 1139 |

The blends compatibilized with amine-g-CBC2-(7 and 9) gives the best ultimate elongation and toughness. The MAH-g-CBC2-(6) also shows good improvement of tensile elongation and toughness. The MAH-g-OBC (J) and amine-g-OBC (K) showed improvements in tensile elongation and toughness, but caused significant reduction in modulus. In contrast, the combination of MAH-g-PE and MAH-g-PP (I) was not effective in improving blend properties.

3. LLDPE/PP/PA Blends with 33.3 Wt % PA Based on Sum Weight of LLDPE+PP+PA

In this example, the PE, PP and polyamide blend is compatibilized to achieve property improvement. The blend compositions are shown in Table 11. The tensile properties are shown in Table 12 and FIG. 8.

TABLE 12

Tensile properties of blends (PE/PP/PA system)

| Example | Ult elongation (%) | Toughness (in*lbf) | 2% Secant Modulus (psi) | Stress at break (psi) |
|---|---|---|---|---|
| L | 3.6 | 0.7 | 98049 | 2216 |
| M | 6.1 | 1.3 | 82882 | 2000 |
| 10 | 9.9 | 3.4 | 106992 | 3562 |
| 11 | 20.9 | 8.7 | 107990 | 3542 |
| 12 | 18.3 | 7.5 | 105948 | 3563 |
| N | 6.7 | 2.1 | 105251 | 3551 |
| O | 6.9 | 2.7 | 125381 | 4330 |
| P | 16.0 | 6.4 | 114526 | 3673 |
| Q | 19.0 | 5.8 | 71133 | 2836 |
| 13 | 8.0 | 2.6 | 109743 | 3433 |
| 14 | 5.5 | 1.5 | 107830 | 2953 |
| R | 5.8 | 1.0 | 66713 | 1901 |
| 15 | 10.9 | 3.6 | 83203 | 3429 |

The blends compatibilized with MAH-g-CBC2-(11 and 12) give the best ultimate elongation and toughness. The initial MAH grafting level needs to be at least 0.45 wt % to have effective compatibilization. The combination of MAH-g-PE and MAH-g-PP(P) is also effective in improving blend properties. MAH-g-OBC (Q) and MAH-g-BC1 (15) improve the tensile elongation of the blends, but cause significant reduction modulus.

Figure 9:
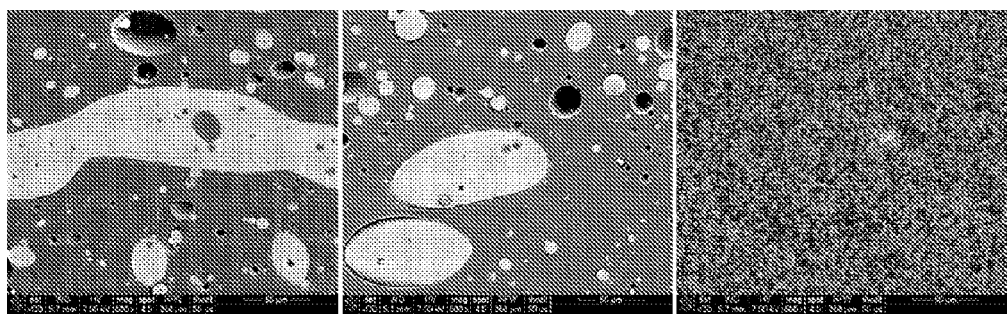
FIG. 9 shows backscatter SEM images for Comparative Example L, Comparative Example M and Example 12.

FIG. 9 is a backscatter electron image showing the morphology of PE-PP-PA ternary blend. The brightest features in the images are associated with the PA phase which is stained more aggressively with RuO4. The darkest features are holes

TABLE 11

Blending compositions (PE/PP/PA system)

| Example | LDPE | PP | PA | CBC2 | MAH-g-CBC2-2 | MAH-g-CBC2-3 | MAH-g-CBC2-4 | MAH-g-PE | MAH-g-PP | MAH-g-OBC | Amine-g-CBC2-4 | Amine-g-CBC2-2 | BC1 | MAH-g-BC1 |
|---|---|---|---|---|---|---|---|---|---|---|---|---|---|---|
| L | 33.3 | 33.3 | 33.3 | — | — | — | — | — | — | — | — | — | — | — |
| M | 30 | 30 | 30 | 10 | — | — | — | — | — | — | — | — | — | — |
| 10 | 30 | 30 | 30 | — | 10 | — | — | — | — | — | — | — | — | — |
| 11 | 30 | 30 | 30 | — | — | 10 | — | — | — | — | — | — | — | — |
| 12 | 30 | 30 | 30 | — | — | — | 10 | — | — | — | — | — | — | — |
| N | 30 | 30 | 30 | — | — | — | — | 10 | — | — | — | — | — | — |
| O | 30 | 30 | 30 | — | — | — | — | — | 10 | — | — | — | — | — |
| P | 30 | 30 | 30 | — | — | — | — | 5 | 5 | — | — | — | — | — |
| Q | 30 | 30 | 30 | — | — | — | — | — | — | 10 | — | — | — | — |
| 13 | 30 | 30 | 30 | — | — | — | — | — | — | — | 10 | — | — | — |
| 14 | 30 | 30 | 30 | — | — | — | — | — | — | — | — | 10 | — | — |
| R | 30 | 30 | 30 | — | — | — | — | — | — | — | — | — | 10 | — |
| 15 | 30 | 30 | 30 | — | — | — | — | — | — | — | — | — | — | 10 | in the image caused by PA phase being pulled out during sectioning. Large PA particle sizes (>25 um) are observed with blends L and M, whereas a fine graining PA morphology is observed in blend 12 as a result of effective compatibilization.

Figure 10:
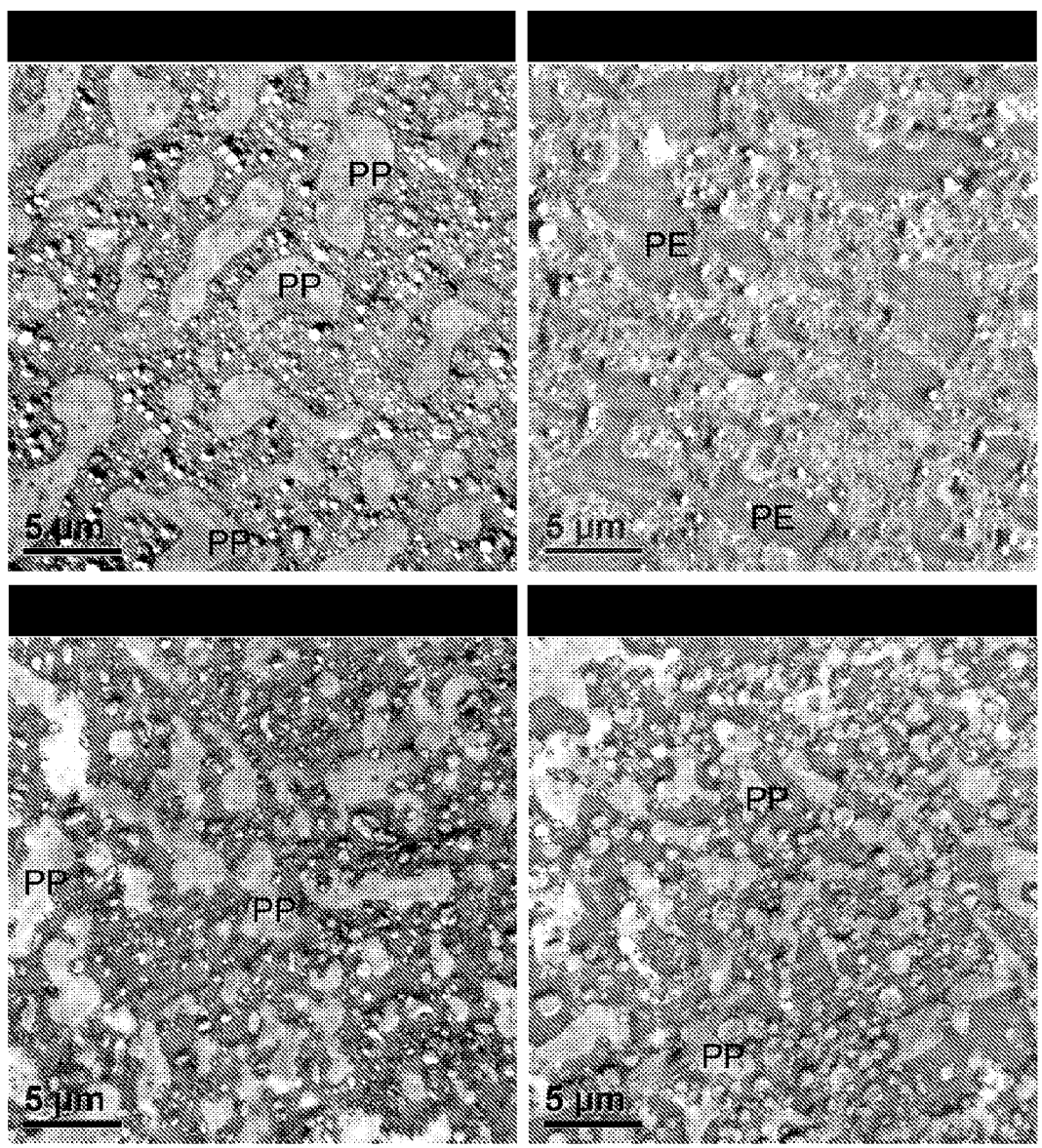
FIG. 10 shows TEM images of Comparative Example N, Comparative Example O, Comparative Example Q and Example 12.

FIG. 10 is a TEM micrograph showing the morphology of PE-PP-PA ternary blends at higher resolution. Based on the staining applied, the darker domains are PE and the large lighter domains are PP. The very small lighter domains are PA. In all three examples, good dispersion and small PA domains strongly suggests the presence of good compatibilization between polyolefin phase and PA phase. In Example 12, PP phase shows the smaller domain size indicating MAH-g-CBC2-4 not only effectively compatibilizes polyolefin and PA phases, but also PP and PE phases. The particle size for Examples N, O, Q and 12 is shown Table 13.

TABLE 13

Particle size of disperse phase for PE/PP/PA system

| Examples | Modifier | avg particle diameter of dispersed phase (um) | avg particle area of dispersed phase (um²) |
|---|---|---|---|
| N | MAH-g-PE (1.2 wt % MAH) | 3.22 | 8.1 |
| O | MAH-g-PP (1.0 wt % MAH) | 3.02 | 7.2 |
| Q | MAH-g-OBC (0.95 wt % MAH) | 2.76 | 6.0 |
| 12 | MAH-g-CBC2-4 (0.64 wt % MAH) | 2.67 | 5.6 |

4. LLDPE/PP/PET Blends with 33.3 Wt % PET Based on Sum Weight of LLDPE+PP+PET

In this example, the PE, PP and PET blend is compatibilized to achieve property improvement. The blend compositions and tensile properties are shown in Table 14.

TABLE 14

Blending compositions (PE/PP/PET system)

| Example | LDPE | PP | PET | CBC2 | MAH-g-CBC2-2 | MAH-g-CBC2-3 | MAH-g-CBC2-4 | MAH-g-PE | MAH-g-PP | MAH-g-OBC |
|---|---|---|---|---|---|---|---|---|---|---|
| S | 33.3 | 33.3 | 33.3 | — | — | — | — | — | — | — |
| T | 30 | 30 | 30 | 10 | — | — | — | — | — | — |
| 16 | 30 | 30 | 30 | — | 10 | — | — | — | — | — |
| 17 | 30 | 30 | 30 | — | — | 10 | — | — | — | — |
| 18 | 30 | 30 | 30 | — | — | — | 10 | — | — | — |
| U | 30 | 30 | 30 | — | — | — | — | 10 | — | — |
| V | 30 | 30 | 30 | — | — | — | — | — | 10 | — |
| W | 30 | 30 | 30 | — | — | — | — | 5 | 5 | — |
| X | 30 | 30 | 30 | — | — | — | — | — | — | 10 |

TABLE 15

Tensile properties of blends (PE/PP/PET system)

| Example | Ult elongation (%) | Toughness (in*lbf) | 2% Secant Modulus (psi) | Stress at break (psi) |
|---|---|---|---|---|
| S | 2.3 | 0.1 | 79761 | 1887 |
| T | 3.2 | 0.3 | 77537 | 1979 |
| 16 | 6.0 | 0.9 | 88126 | 3309 |

TABLE 15-continued

Tensile properties of blends (PE/PP/PET system)

| Example | Ult elongation (%) | Toughness (in*lbf) | 2% Secant Modulus (psi) | Stress at break (psi) |
|---|---|---|---|---|
| 17 | 7.8 | 1.3 | 87833 | 3545 |
| 18 | 7.4 | 1.2 | 83693 | 3322 |
| U | 7.0 | 1.1 | 79937 | 3385 |
| V | 4.2 | 0.5 | 93069 | 3282 |
| W | 5.9 | 0.9 | 81734 | 3323 |
| X | 8.5 | 1.0 | 56186 | 2379 |

The blends compatibilized with MAH-g-CBC2 (Ex. 16, 17 and 18) improve the ultimate elongation and toughness as compared to Ex. S and T. MAH-g-PE (Ex. U) is also effective in improving blend properties. The MAH-g-OBC (Ex. X) shows improvements in the tensile elongation of the blends, but causes significant reduction in modulus.

Figure 11:
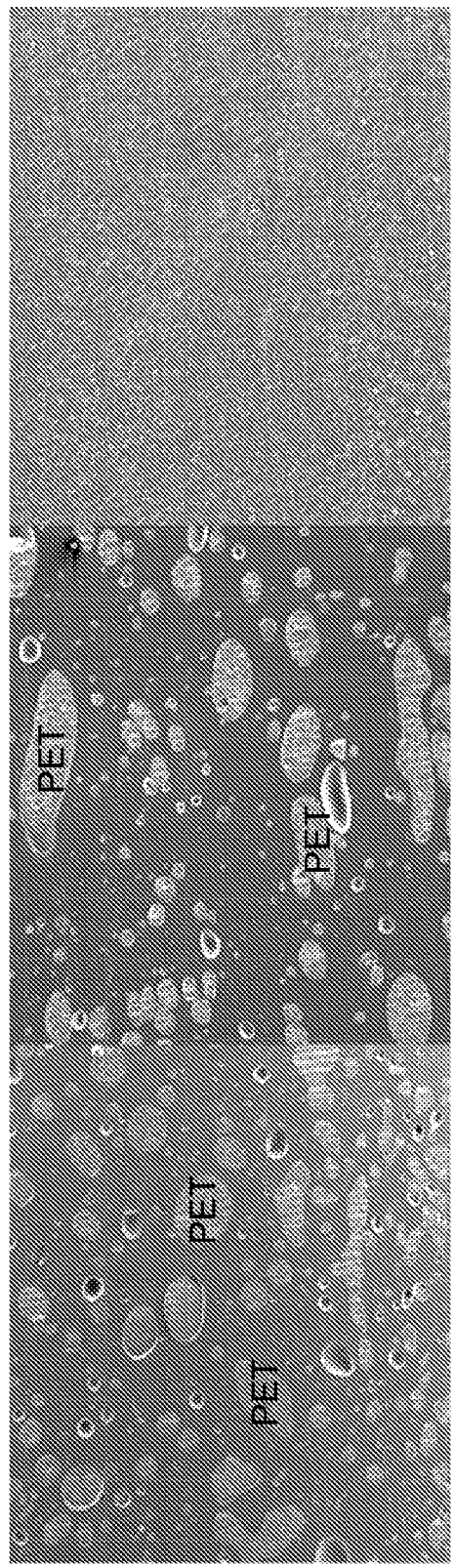
FIG. 11 shows backscatter SEM images for Comparative Example S, Comparative Example T and Example 18.

FIG. 11 is a backscatter electron image showing the morphology of PE-PP-PET ternary blend. The brightest features in the images are associated with the PET phase. The darkest features are holes in the image caused by PET phase being pulled out during sectioning. Large PET particle sizes (>50 um) are observed with blends S and T, whereas a fine graining PET morphology is observed in blend 18 as a result of effective compatibilization.

Figure 12:
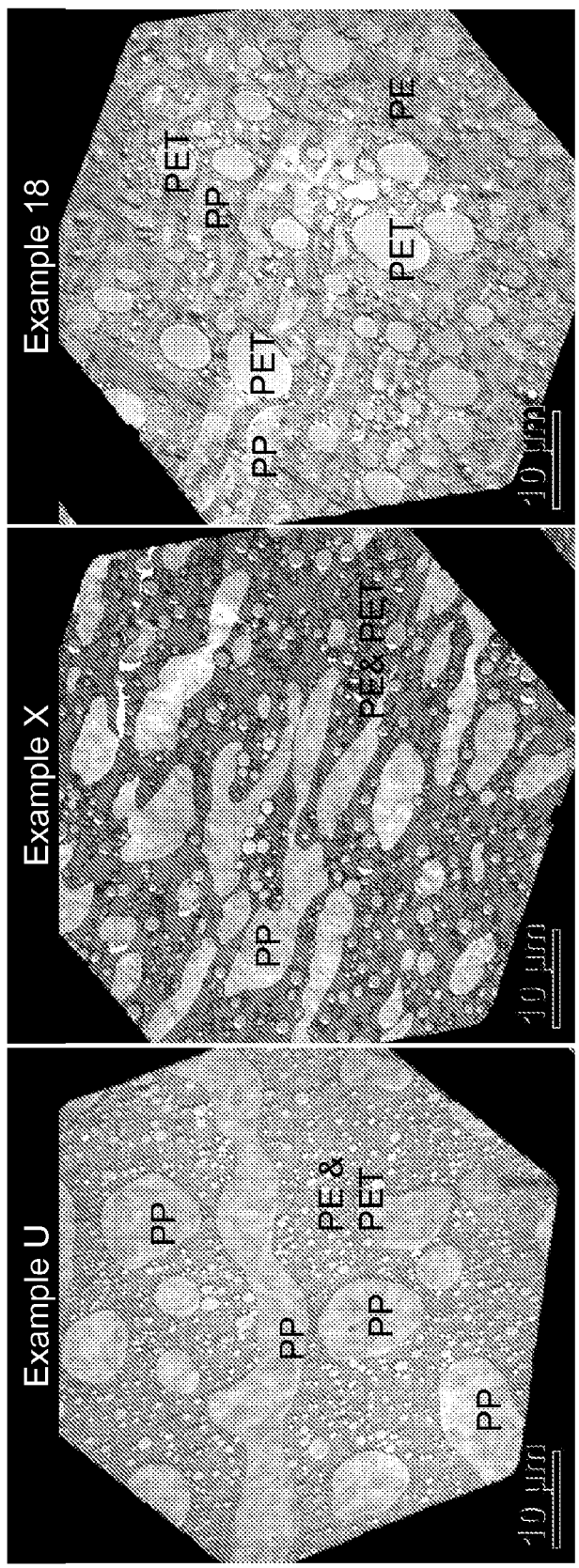
FIG. 12 shows TEM images of Comparative Example S, Comparative Example T and Example 18.

FIG. 12 is a TEM micrograph showing the morphology of PE-PP-PET ternary blends at higher resolution. Based on the staining applied, the darker matrix is PE and the lighter domains are PP. The small, white, smooth looking domains are PET. In all three examples, good dispersion and small PET domains strongly suggests the presence of good compatibilization between polyolefin phase and PET phase. Ex. 18 has larger PET particles due to a relatively low MAH grafting level of 0.64% as compared to MAH-g-PE (1.2% MAH grafting level in Ex. U) and MAH-g-OBC (0.95% MAH grafting level in Ex. X). As for the PP phase dispersion, Ex. X and Ex. 18 have an irregular shaped and finely dispersed PP phase, whereas Ex. U shows less uniform PP dispersions with large particles. This contrast indicates MAH-g-CBC2-4 not only effectively compatibilizes polyolefin and PET phases, but also PP and PE phases. The PP particle size is shown in Table 16.

TABLE 16

| | Particle size of disperse phase for PE/PP/PET system | | |
|---|---|---|---|
| Examples | Modifier | avg particle diameter of dispersed phase (um) | avg particle area of dispersed phase (um$^2$) |
| U | MAH-g-PE (1.2 wt % MAH) | 7.2 | 40.7 |
| X | MAH-g-OBC (0.95 wt % MAH) | 5.4 | 22.9 |
| 18 | MAH-g-CBC2-4 (0.64 wt % MAH) | 5.6 | 24.6 |

The invention claimed is:

1. A composition comprising:
   a) a first polymer;
   b) a second polymer;
   c) a third polymer; and,
   d) a compatibilizer, wherein the compatibilizer is
      i) a functionalized olefin-based polymer formed from at least (A) and (B):
         (A) a block composite comprising:
            a. a block copolymer comprising a propylene-based crystalline block and an ethylene/α-olefin block;
            b. a propylene-based crystalline polymer; and,
            c. an ethylene/α-olefin polymer; and
         (B) at least one functionalization agent; and/or
      (ii) a functionalized olefin-based polymer formed from at least (A) and (B):
         (A) a crystalline block composite comprising:
            a. a block copolymer comprising a propylene-based crystalline block and crystalline ethylene-based block;
            b. a propylene-based crystalline polymer; and,
            c. a crystalline ethylene-based polymer; and
         (B) at least one functionalization agent,
   wherein the first, second and third polymers are different, and
   wherein the compatibilizer is present in an amount of from 2 wt % to 20 wt %, the first polymer is present in an amount of from 5 wt % to 85 wt %, the second polymer is present in an amount of from 5 wt % to 40 wt %, and the third polymer is present in an amount of from 5 wt % to 50 wt %, by the total weight of the polymers.

2. The composition of claim 1 wherein the first polymer is a polyethylene, the second polymer is a polypropylene and the third polymer is selected from the group of polyamide, polyurethane, polyester, polyethers, polyetherimides, polyvinylalcohols, polycarbonates, polylactic acids, polyamide esters and combinations thereof.

3. The composition of claim 1 wherein the compatibilizer comprises a block composite and the functionalization agent is selected from maleic anhydride, peroxide, and amine.

4. The composition of claim 1 wherein the compatibilizer includes the crystalline block composite and the functionalization agent is selected from maleic anhydride, peroxide, and amine.

5. The composition of claim 1 wherein the compatibilizer is (i) and the propylene-based crystalline block comprises 90 mol % to 100 mol % propylene.

6. The composition of claim 1 wherein the compatibilizer is (ii) and the crystalline propylene-based block comprises 90 mol % to 100 mol % propylene and the crystalline ethylene based block has a comonomer content between 0 mol % and 7 mol %.

7. The composition of claim 1 wherein the compatibilizer is (i) and the functionalization agent is maleic anhydride in a grafting level of from 0.10 wt % to 1.8 wt %.

8. The composition of claim 1 wherein the compatibilizer is (ii) and the functionalization agent is maleic anhydride in a grafting level of from 0.10 wt % to 1.8 wt %.

9. The composition of claim 1 wherein the first polymer is polyethylene, the second polymer is a polypropylene, and the third polymer is a polyurethane.

10. The composition of claim 1 wherein the first polymer is a low density polyethylene, the second polymer is a polypropylene, and the third polymer is a polyurethane.

* * * * *